United States Patent [19]

Cass et al.

[11] Patent Number: 5,245,674
[45] Date of Patent: Sep. 14, 1993

[54] IMAGE PROCESSING USING DISTANCE AS A FUNCTION OF DIRECTION

[75] Inventors: Todd A. Cass, Cambridge, Mass.; Daniel P. Huttenlocher; Peter C. Wayner, both of Ithaca, N.Y.

[73] Assignee: Xerox Corporaton, Stamford, Conn.

[21] Appl. No.: 737,957

[22] Filed: Jul. 30, 1991

[51] Int. Cl.$^5$ .................. G06K 9/46; G06K 9/50; G06K 9/66
[52] U.S. Cl. .................................. 382/16; 382/20; 382/22; 382/18
[58] Field of Search .................. 382/18, 20, 21, 22, 382/39, 68, 16

[56] References Cited

U.S. PATENT DOCUMENTS

| | | | |
|---|---|---|---|
| 2,838,602 | 6/1958 | Sprick | 382/18 |
| 2,983,822 | 5/1961 | Brouillette | 382/21 |
| 3,297,989 | 1/1967 | Atchley et al. | 382/28 |
| 4,802,230 | 1/1989 | Horowitz | 382/37 |
| 4,847,912 | 7/1989 | Tanaka et al. | 382/9 |
| 4,989,258 | 1/1991 | Takahashi et al. | 381/37 |
| 5,054,094 | 10/1991 | Barski | 382/68 |
| 5,131,054 | 7/1992 | Smith | 382/27 |

OTHER PUBLICATIONS

Lettera, C., Maier, M. Masera, L., and Paoli, C., "Character Recognition in Office Automation," in Cappellini, V. and Marconi, R. (eds.), *Advances in Image Processing and Pattern Recognition*, Elsevier Science Publishers, 1986, pp. 191-198.

Toussaint, G. T., "Pattern Recognition and Geometrical Complexity," *Proceedings of 5th International Conference on Pattern Recognition*, Dec. 1-14, 1980, vol. 2, IEEE, pp. 1324-1347.

Borgefors, G., "Distance Transforms in Digital Images," *Computer Vision Graphics and Image Processing*, vol. 34 (1986), pp. 344-371.

Ahuja, N., and Schachter, B. J., *Pattern Models*, John Wiley and Sons, New York, 1983, Chapter 1, pp. 1-73.

Mahoney, J. V., *Image Chunking: Defining Spatial Building Blocks for Scene Analysis*, Dep't. of Elec. Eng. and Comp. Sci., M.I.T., 1987 ("the Mahoney thesis"), pp. 31-37.

*Primary Examiner*—Leo H. Boudreau
*Assistant Examiner*—David Fox

[57] ABSTRACT

Characteristics of images such as skew of lines of text or dominant typeface of characters are detected by producing distance data. Distance data is produced for each of a number of starting pixels within an image. Each starting pixel meets a criterion, such as an edge pixel or a pixel inside a connected component. Each starting pixel's distance data indicates the distance in each of a number of directions from the starting pixel to another pixel at which the image meets another criterion. For example, to detect skew of lines of text, the distance data can indicate distance from a starting pixel at an edge across white pixels to another edge. To detect dominant typeface, the distance data can indicate distance from a starting pixel at an edge or inside a connected component across black pixels to another edge. The separating angle between adjacent directions can be small enough to detect features of an appropriate size at an appropriate distance, such as features of character size at the average intercharacter spacing. The distances at each direction from all the starting pixels can be averaged to obtain a combined distance at each direction. A sufficient number of starting pixels can be used so that the combined distance is approximately the same as if every pixel in the image were a starting pixel. The combined distances at all the directions form a profile.

33 Claims, 20 Drawing Sheets

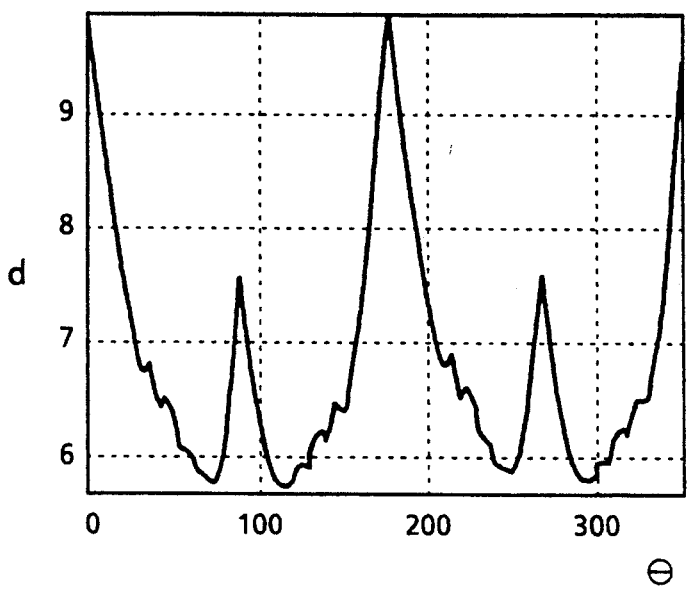
Fig. 19
Fig. 20
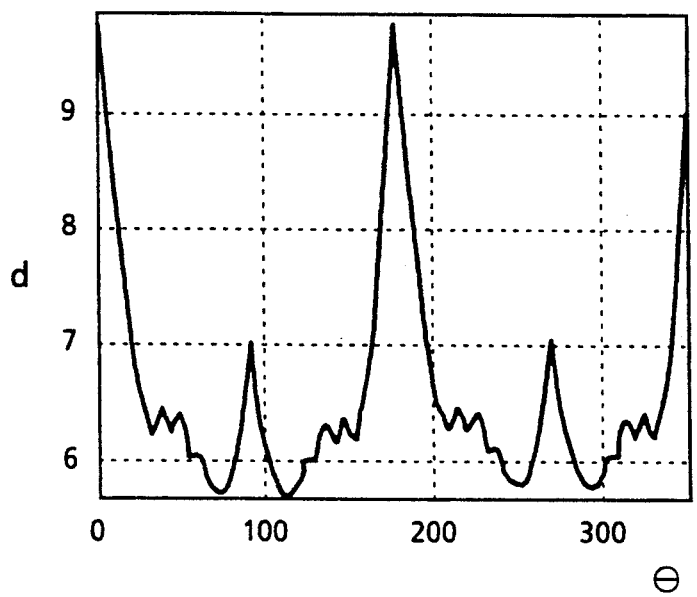
Fig. 21
Fig. 22

IMAGE PROCESSING USING DISTANCE AS A FUNCTION OF DIRECTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to analysis of an image.

Lettera, C., Maier, M., Masera, L., and Paoli, C., "Character Recognition in Office Automation," in Cappellini, V. and Marconi, R., (eds.), *Advances in Image Processing and Pattern Recognition*, Elsevier Science Publishers, 1986, pp. 191-198, describe character recognition techniques based on feature extraction and statistical classification. As described on page 192, histograms of the black pixels are counted, for each character, along the horizontal, vertical, and diagonal directions, to obtain useful features. The vertical projection is illustrated in FIG. 1. Histogram vectors obtained with an interval width of one pixel are transformed into vectors of eight elements for further processing.

Tanaka et al., U.S. Pat. No. 4,847,912, describe a technique of detecting a space between words with an optical character reader. As shown and described in relation to FIGS. 2-6, the reader scans each printed line in the direction of its height from its beginning to its end sequentially at a predetermined interval. The intervals are identified either as containing a printed part, represented by a black bit, or as being all white, represented by a white bit. The number of continuous white bits between black bits is counted. The histogram of the counts has two peaks corresponding to gaps between letters and gaps between words. The histogram is used to determine a threshold value for detecting a space between words, so that the beginning of each word can be identified.

Toussaint, G. T., "Pattern Recognition and Geometrical Complexity," *Proceedings of 5th International Conference on Pattern Recognition*, Dec. 1-4, 1980, Vol. 2, IEEE, pp. 1324-1347, surveys geometrical structures used to solve various pattern recognition problems. Section 2 describes several basic computational structures that depend on distance between neighboring points in an image, including the Voronoi diagram and the Delaunay triangulation. Section 7 describes techniques for nearest neighbor searching; the straightforward approach of computing distance from a point to all other points can be improved upon by using the Voronoi diagram to create slabs and compartments within each slab; other techniques have been proposed for reducing the number of distance calculations. Section 11 describes visibility problems including visibility of a polygon from a point.

Borgefors, G., "Distance Transforms in Digital Images," *Computer Vision Graphics and Image Processing*, Vol. 34 (1986), pp. 344-371, describes distance transformations that convert a binary digital image, consisting of feature and non-feature pixels, into an image where each non-feature pixel has a value corresponding to the distance to the nearest feature pixel. To compute the distances with global operations would be prohibitively costly; the paper describes digital distance transformation algorithms that use small neighborhoods and that give a reasonable approximation of distance. Page 345 explains that such algorithms are based on approximating global distance in the image by propagating local distances, i.e. distances between neighboring pixels. The distance transformations are described in graphical form as masks, as shown in FIG. 2; the local distance in each mask-pixel is added to the value of the image pixel below it and the minimum of the sums becomes the new image pixel value. Parallel computation of such a distance transformation requires a number of iterations proportional to the largest distance in the image. Section 3, beginning on page 347, describes optimal distance transformations for different image sizes. Section 4, beginning on page 362, compares several examples, including computing the distance from an object or object contour, in Section 4.3, and computing a pseudo-Dirichlet or Voronoi tesselation, in Section 4.4.

Ahuja, N., and Schachter, B. J., *Pattern Models*, John Wiley and Sons, New York, 1983, Chapter 1, pp. 1-73, describe tessellations beginning at page 4. Section 1.3.5, beginning on page 15, describes Voronoi and Delaunay tessellations, indicating that a Voronoi polygon is the locus of points closer to a vertex than to any other vertex and that the Delaunay triangulation is a dual of a Voronoi tessellation. Algorithms for constructing the Delaunay triangulation are described beginning at page 22. Section 1.3.5.4, beginning on page 32, describes the use of the Voronoi polygon for neighborhood definition, reviewing other techniques for defining the neighborhood of a point and comparing them with the Voronoi approach. FIG. 1.3.5.4-2 shows how Voronoi neighbors of a point may be farther from it than nonneighbors, because Voronoi neighbors are not necessarily its nearest neighbors—the Voronoi neighbors of a point must surround it.

Mahoney, J. V., *Image Chunking: Defining Spatial Building Blocks for Scene Analysis*, Dep't. of Elec. Eng. and Comp. Sci., M.I.T., 1987 ("the Mahoney thesis"), pp. 31-37, describes techniques for detecting abrupt change boundaries by direct comparisons between neighboring elements. Pages 32-34 describe the directional nearest neighbor graph, useful for computing an explicit representation of the neighbors of each image property element, and compare it to the Voronoi dual.

SUMMARY OF THE INVENTION

The present invention provides techniques for analyzing an image. Data defining the image can be used to obtain distance data indicating distances in each of a plurality of directions from a starting location to other locations that meet a criterion, such as edge pixels. The distance data can be stored or transmitted for use in subsequent image analysis operations.

Many conventional techniques extract information about image characteristics. For example, some conventional text image analysis techniques obtain projection histograms, and the histograms can then be used for segmentation and recognition. Various other techniques are known.

One aspect of the invention is based on the discovery of a new technique for obtaining information about image characteristics. This technique obtains distance data indicating distances in each of a plurality of directions from a location in the image to other locations that meet a criterion. The resulting distance data can then be used for a variety of image analysis operations. For example, distance data obtained from an image that includes text can then be used in further new techniques that detect skew of text lines or that identify dominant typeface.

The distance data technique of the invention can be implemented by following lines through an image that start at a common starting location and that extend in each of a plurality of directions. The technique measures length as it follows each line until a respective ending location is reached at which the image meets the criterion. The length of the line from the starting location to the ending location is the distance in the direction. For example, the ending criterion could be an edge, so that the distance could be the length across white pixels to the nearest black pixel or the length across black pixels to the nearest white pixel.

The distant data technique can be implemented with a machine that includes memory for storing data items that each indicate a value for a respective location in the image. The machine also includes a processor with means for obtaining distance data as described above. The distance data means can include length means for obtaining data indicating length along a line from a first location in a direction. The distance data means can also include criterion means for using the length data to access the data item of a second location in the direction from the first location to determine whether the second location meets the criterion. The system can also include storing means responsive to the length means and the criterion means for storing the length data from the length means when the criterion means indicates that the second location meets the criterion. The length data is stored so that it can be accessed using direction data indicating the direction and can be provided as distance data.

The distance data technique described above avoids a number of problems that arise with conventional techniques. For instance, histogram techniques generally require segmentation of an image of text into units such as lines or characters, with each unit being separately histogrammed within a bounded part of the image.

The technique for obtaining distance data as described above avoids the need to segment the image into lines of text, characters, or other units. Although the technique could be applied to segments of an image, it can also be used to obtain a distance in a given direction in an unsegmented image. As a result, an image can be analyzed without performing the computation necessary for segmentation.

The technique for obtaining distance data as described above also avoids a problem with conventional projection histogram techniques that project a line of text, a single character, or another unit of text in an image onto some axis. Because projection sacrifices certain types of information about local characteristics, it can lead to a form of aliasing. A projection histogram ignores gaps that occur in the direction of projection; thus a number of different pixel patterns can produce the same histogram. This phenomenon is herein referred to as "gap aliasing." One example of gap aliasing occurs in histogramming the pixels of a character that has one or more internal gaps between or within strokes, such as an "O" or an "E," because a line projected through the character does not indicate the presence or positions of gaps.

The distance data technique described above can avoid gap aliasing and similar problems because it produces distance data indicating a length in each direction to a location meeting a criterion. As noted above, the technique can produce distance data to the closest edge in each direction. The distance data technique therefore preserves information that would be lost by projection histogramming. Specifically, the distance data technique is not susceptible to gap aliasing because gaps in a character are not ignored-when a line in one of the directions reaches an edge, such as the edge of a gap in a character, the distance is obtained to the edge so that information about gaps is preserved. In short, the technique described above is especially suitable for measuring characteristics of an image that includes strokes of dark pixels separated by gaps, such as an image of text.

A closely related aspect of the invention is based on the observation of a problem that arises in obtaining distance data in plural directions. Distance data could be obtained in a small number of directions, by analogy to conventional projection histogram techniques. Such techniques typically obtain histograms in a small fixed number of directions, such as vertical, horizontal, and two diagonal directions. But measuring distance or histogramming in a small fixed number of directions is not adequate for many image analysis problems, including skew detection, dominant typeface detection, character recognition, and others, because of problems such as gap aliasing.

This aspect is further based on the discovery of a relationship between the number of directions in which distance data is obtained and the information obtained. If the angle between adjacent directions is no larger than a maximum angle $\theta$, any connected set of pixels or "blob" is certain to be detected only if it subtends an angle of at least $\theta$ in relation to a starting location. Similarly, a gap between blobs is certain to be detected only if it subtends an angle of at least $\theta$. Therefore, a pattern of blobs and gaps is not reliably resolvable from a starting location if some of the blobs and gaps subtend angles less than $\theta$ in relation to the starting location. The angle that a blob or a gap subtends in relation to a starting location depends on its radial distance from the starting location and on its tangential extent. From these considerations, it follows that more information about smaller or more distant blobs and gaps can be obtained by reducing $\theta$, the maximum angle between adjacent directions. If N directions are equally spaced, $\theta = 360°/N$.

As a general rule then, if the marks and spaces in an image of text are all greater than or equal to a minimum measurable size, such as the size of a pixel or group of pixels, one-half the arctangent of the ratio of the minimum measurable size to the outer dimension of the image provides a measure of the smallest angular difference between directions that can produce additional information about the text. Measurements at the smallest angular difference can extract all the information about the marks and spaces, while measurements at a slightly larger angle may provide sufficient information for a given purpose. For example, if the radial distance from the starting location to a blob is only measured if it is less than or equal to a limit, the angular difference can be just small enough to detect a blob of one pixel size at the limit.

This aspect is further based on the discovery of another factor in obtaining information in an image that includes text or the like. In such an image, a line extending in a given direction is likely to intersect several locations at which an edge occurs. It would be computationally complex to consider more than one of these edges along every line. But if only the first edge is considered, distant blobs are obscured by closer blobs, so that reducing θ below the angle necessary to detect the closer blobs does not produce significant additional information. For example, to measure characteristics of text, this angle can be roughly estimated by taking one-half the arctangent of the ratio of the minimum character diameter to the average distance between blobs of interest.

The problem of obtaining distance data in a sufficient number of directions can be solved in a number of ways. The general solution is to obtain distance data in sufficient directions so that the angle between adjacent directions is small enough to detect at least some of the blobs being detected. The directions can be separated by approximately the same angle so that the same blob size is detected in all directions. The angle between directions can be iteratively reduced until all blobs of interest are detected. Or the angle can be estimated by taking the arctangent of a ratio such as the ratio of the size of the blobs of interest to the distance between the blobs of interest or the ratio of the minimum size of the blobs of interest to the outer dimension of the image.

Another aspect of the invention is based on the discovery that useful information about an image can be obtained by considering distance data for a plurality of starting locations. This aspect is also based on the observation that obtaining distance data in a large number of directions for a number of starting locations quickly produces an unmanageable amount of data. This problem can be alleviated by combining the distance measurements at each direction over a number of starting locations, obtaining distribution data indicating a distribution of distances in each direction. The resulting combined measurements provide a profile of distance as a function of direction for the image, and this profile can provide information about text characteristics. The measurements can be combined, for example, by obtaining an average of the distance measurements at a given direction.

A number of closely related aspects of the invention are based on the discovery of operations that use distance data obtained by the techniques described above to produce useful information about text characteristics. Each operation depends on the discovery of an appropriate type of distance data to obtain information about a particular text characteristic.

One such characteristic is skew. Images that include lines of text can often be usefully characterized by the skew of the lines. Such information can be used, for example, in correcting skew or in compensating for the effects of skew. An operation can detect approximate skew of lines of text by finding the distance from an adge pixel across white pixels to the nearest edge pixel at each of a set of directions. When results for a number of starting pixels are combined at each direction, minima occur at two directions separated by 180 degrees, which are the directions parallel to the lines of text.

Another such characteristic is dominant typeface. Typeface information can be used, for example, in character recognition. An image analysis operation can detect dominant typeface by finding the distance from a black pixel or from an edge pixel across black pixels to the nearest edge pixel at each of a set of directions. The distances at each direction can be combined to obtain a profile of distance as a function of direction. After compensating for the effects of skew, the profile can be compared with profiles for model images of typefaces to find the best match.

Profiles of model images as described above can be used for various purposes. A closely related aspect of the invention is based on the observation of a problem in using such profiles. The operation of scanning and analyzing a number of model images is computationally expensive. This problem can be solved by storing the resulting profiles on a memory medium until they are needed or by transmitting profiles through a transmission medium to another location. In order to facilitate retrieval, the distance data can be stored or transmitted so that it can be accessed by direction.

Another closely related aspect of the invention is based on the observation that it is computationally expensive to obtain a profile of distance as a function of direction for every pixel in an image. Such an operation produces a complete representation or transform of local geometry that may include more information than necessary for a specific image analysis task. This aspect is based on the further observation that there is substantial redundancy in a complete set of profiles for the pixels of an image, in part because the profile for each pixel provides highly similar information to many of its neighbors. Therefore, the necessary computation can be substantially reduced by obtaining distance measurements for a smaller number of locations. The locations can be chosen so that the profile that results from combining their distance measurements closely approximates the profile for the image as a whole.

The following description, the drawings, and the claims further set forth these and other aspects, objects, features, and advantages of the invention.

BRIEF DESCRIPTION OF THE DRAWINGS

FIG. 2 is a schematic drawing of part of an image, showing another way in which a blob edge can be detected by measuring distance from a starting location as a function of direction.

FIG. 19 is a sample of an image of text in Bookman typeface style.

FIG. 20 is a profile of distance as a function of direction for the image of FIG. 19.

FIG. 21 is a sample of an image of text in Avant Garde typeface style.

FIG. 22 is a profile of distance as a function of direction for the image of FIG. 21.

DETAILED DESCRIPTION

A. Conceptual Framework

Figure 1:
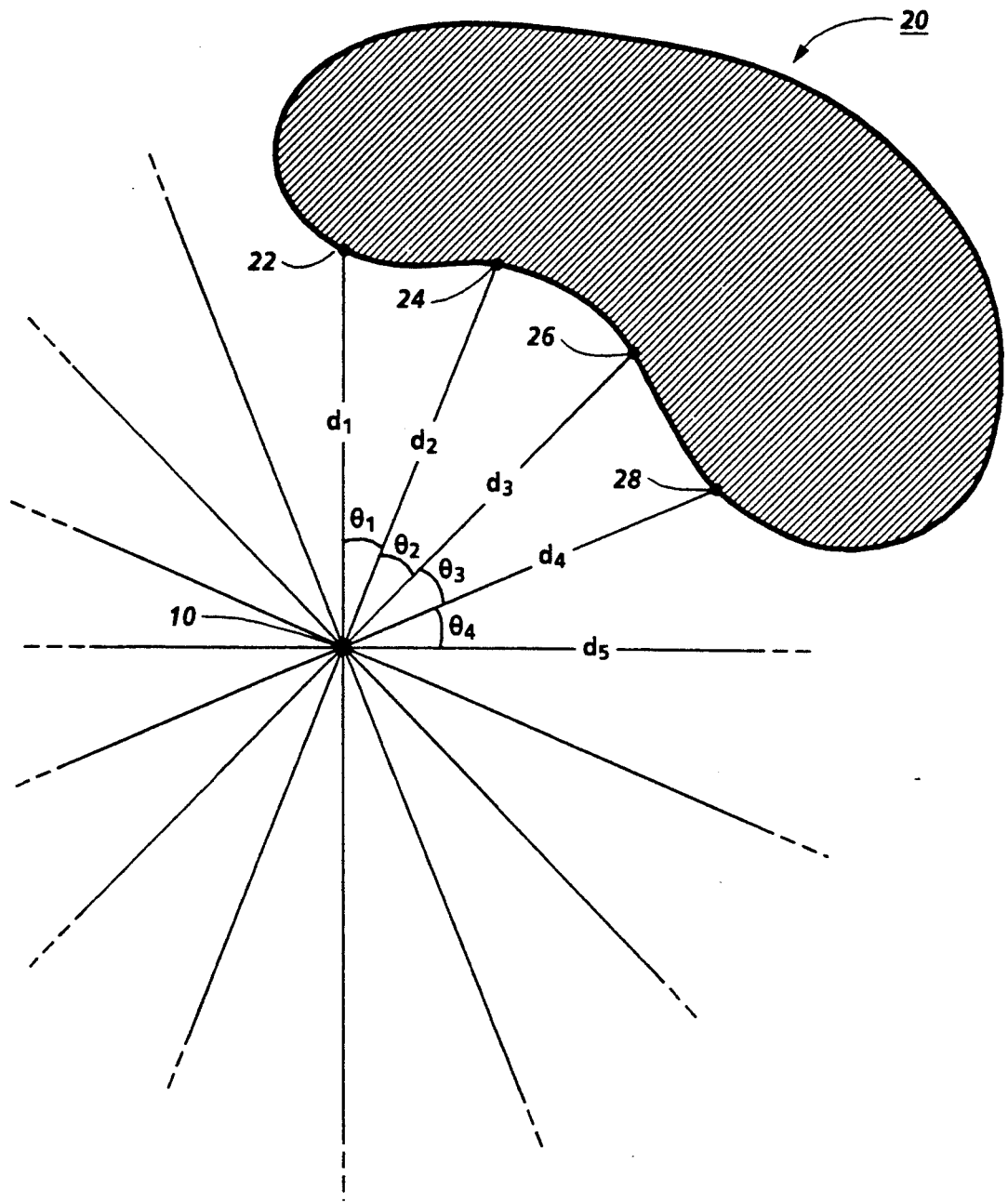

The following conceptual framework is helpful in understanding the broad scope of the invention, and the terms defined below have the meanings indicated throughout this application, including the claims.

"Data" refers herein to signals that indicate information. When an item of data can indicate one of a number of possible alternatives, the item of data has one of a number of "values." For example, a binary item of data has one of two values, such as "0" and "1" or "ON" and "OFF."

"Data" includes data existing in any physical form, and includes data that is transitory or is being stored or transmitted. For example, data could exist as an electromagnetic or other transmitted signal or as a signal stored in electronic, magnetic, or other form. A "data storage medium" or "storage medium" is a physical medium that stores data. A "data transmission medium" or "transmission medium" is a physical medium that transmits data from one location to another.

A "data processing system" is a system that processes data. A "data processor" or "processor" is any component or system that can process data, and may include one or more central processing units or other processing components. A processor performs an operation or a function "automatically" when it performs the operation or function independent of concurrent human control. A "processing unit" is a processor that is a component within another processor.

Any two components are "connected" when there is a combination of circuitry that can transfer data from one of the components to the other. For example, two processing units are "connected" by any combination of connections between them that permits transfer of data from one of the processing units to the other.

"Memory" is any component, combination of components, or system that can store data, and may include local and remote memory and input/output devices.

A processor "accesses" data in memory by any operation that retrieves or modifies the data, such as by reading or writing a location in memory that includes the data. A processor can be "connected for accessing" data by any combination of connections with local or remote memory or input/output devices that permits the processor to access the data.

A processor "uses" data in performing an operation when the result of the operation depends on the value of the data. Stored data can be "accessed using" or "accessible using" other data if the memory containing the stored data responds to the other data or to data that depends on the other data by permitting access to the stored data. For example, the other data may be an address, an offset used to produce an address, or a content-addressable value stored with the stored data.

Data "indicates" an attribute when the data has a value that depends on the existence of the attribute or on a measure of the attribute.

Data indicates a "central value" of an attribute when it has a value that depends on a number of measurements of the attribute and indicates the center of the distribution of measurements. For example, data can indicate a central value of distances or of measurements of another scalar quantity by indicating a mean, mode, median, or other measure of central value.

Data indicates a "variance" of an attribute when it has a value that depends on a number of measurements of the attribute and indicates the degree to which the measurements vary. For example, data can indicate a standard deviation, a sum of squares, or other measure of variance.

Data indicates a "distribution" of an attribute when it has a value that depends on a number of measurements of the attribute. For example, data can indicate a distribution of distances or of measurements of another scalar quantity by indicating a measure of central value; a measure of variance; or a measure combining central value and variance such as the values at which the frequency is a specified number of decibels below the frequency of the mode.

To "obtain" or "produce" data is to perform any combination of operations that begins without the data and that results in the data. Data can be "obtained" or "produced" by any operations that result in the data. Data can be "obtained from" or "produced from" other data by operations that obtain or produce the data using the other data.

An item of data is produced by "combining" other items of data when logical or numerical operations are performed on the other items of data that yield an item of data of the same type. For example, numbers indicating distance can be combined by adding, by calculating the mean or average, by selecting one of the distances, by taking the square root of the sum of the squares, or by performing another similar operation.

"Character" means a discrete element that appears in a written or printed form of a language. Characters in the English language can thus include not only alphabetic and numerical elements, but also punctuation marks, diacritical marks, mathematical and logical symbols, and other elements used in written or printed English. More generally, characters can include, in addition to alphanumeric elements, phonetic, ideographic, or pictographic elements.

A character "has a typeface" when it has an appearance that is characteristic of a typeface. For example, Helvetica and Avant Garde are examples of typefaces that a character could have. Each typeface may include several variations, such as plain, bold, and italic. The term "font" is sometimes used as a synonym for "typeface."

A "text" is an arrangement of one or more lines of characters; the characters of a text may form words. Characters in a text have "a dominant typeface" when a majority of the characters have the typeface. The "skew" or "skew direction" of lines of characters in a text or other lines in an image means the direction in which the lines extend, typically measured as an angle from a reference direction such as horizontal.

An "array of data" or "data array" or "array" is a combination of items of data that can be mapped into an array. A "two-dimensional array" is a data array whose items of data can be mapped into an array having two dimensions.

Data "defines" an array when it includes data sufficient to obtain or produce the array. For example, data defining an array may include the defined array itself, a compressed or encoded form of the defined array, a pointer to the defined array, a pointer to a part of another array from which the defined array can be obtained, or pointers to a set of smaller arrays from which the defined array can be obtained.

An "image" is a pattern of light. An image may include characters, words, and text as well as other items such as graphics. A text may be included in a set of one or more images, such as in images of the pages of a document.

An image may be divided into "segments," each of which is itself an image. A segment of an image may be of any size up to and including the whole image.

Data "defines" an image when the data includes sufficient information to produce the image. For example, a two-dimensional array can define all or any part of an image, with each item of data in the array providing a value indicating the color of a respective location of the image.

Each location in an image may be called a "pixel." In an array defining an image in which each item of data provides a value, each value indicating the color of a location may be called a "pixel value". Each pixel value is a bit in the "binary form" of the image, a grey-scale value in a "grey-scale form" of the image, or a set of color space coordinates in a "color coordinate form" of the image, the binary form, grey-scale form, and color coordinate form each being a two-dimensional array defining the image.

Data is produced by "applying a criterion" to other data when the produced data indicates whether the other data meets the criterion. An operation that applies a criterion produces such data.

A criterion can be "applied" to a location in an image by applying the criterion to data defining the image in a manner that depends on the location. For example, if the image data includes a respective data item for each location, the criterion could depend on a value indicated by a location's data item or it could depend on the values indicated by the respective data items of a set of locations having a relationship to the location. A location "meets a criterion" if application of the criterion to the location produces data indicating that the location meets the criterion.

Pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the neighboring criterion used.

An "edge" occurs in an image when two neighboring pixels have sufficiently different pixel values according to an appropriate criterion for the occurrence of an edge between them. The term "edge pixel" may be applied to one or both of two neighboring pixels between which an edge occurs.

A set of pixels in an image is "connected" if each pixel has at least one neighboring pixel that is in the set and if each pair of pixels in the set are connected by a subset of other pixels in the set. A connected set of pixels bounded by an edge may be called a "connected component" or "blob," and these terms may also be applied to more than one connected sets of pixels that are grouped for image analysis. In an image of text, connected components "form" characters or lines of characters when the edges of the connected components generally follow the outlines of the character; even where connected components form characters, instances may occur in which a character includes more than one connected component and in which a connected component includes parts of two or more characters.

An "image characteristic" or "characteristic" is a measurable attribute of an image. An operation can "measure" a characteristic by producing data indicating the characteristic using data defining an image.

A characteristic is measured "for an image" if the characteristic is measured in a manner that is likely to produce approximately the same result each time it occurs.

A "profile" is data defining a characteristic as a function of a variable. For example, a profile may include data indicating a value of the characteristic for each of a number of directions. If the characteristic is a distribution of distances, the profile may include an average or other indication of the distribution of distances at each of the directions. An operation "compares" profiles by producing data indicating a measure of similarity or difference between the profiles. An operation "clusters" profiles by producing data indicating, for each profile, an equivalence class into which it falls, all of the profiles falling in the same equivalence class being similar and profiles in different equivalence classes being different.

An "image input device" is a device that can receive an image and provide a signal defining a version of the image. A "scanner" is an image input device that receives an image by a scanning operation, such as by scanning a document.

B. General Features

Figure 2:
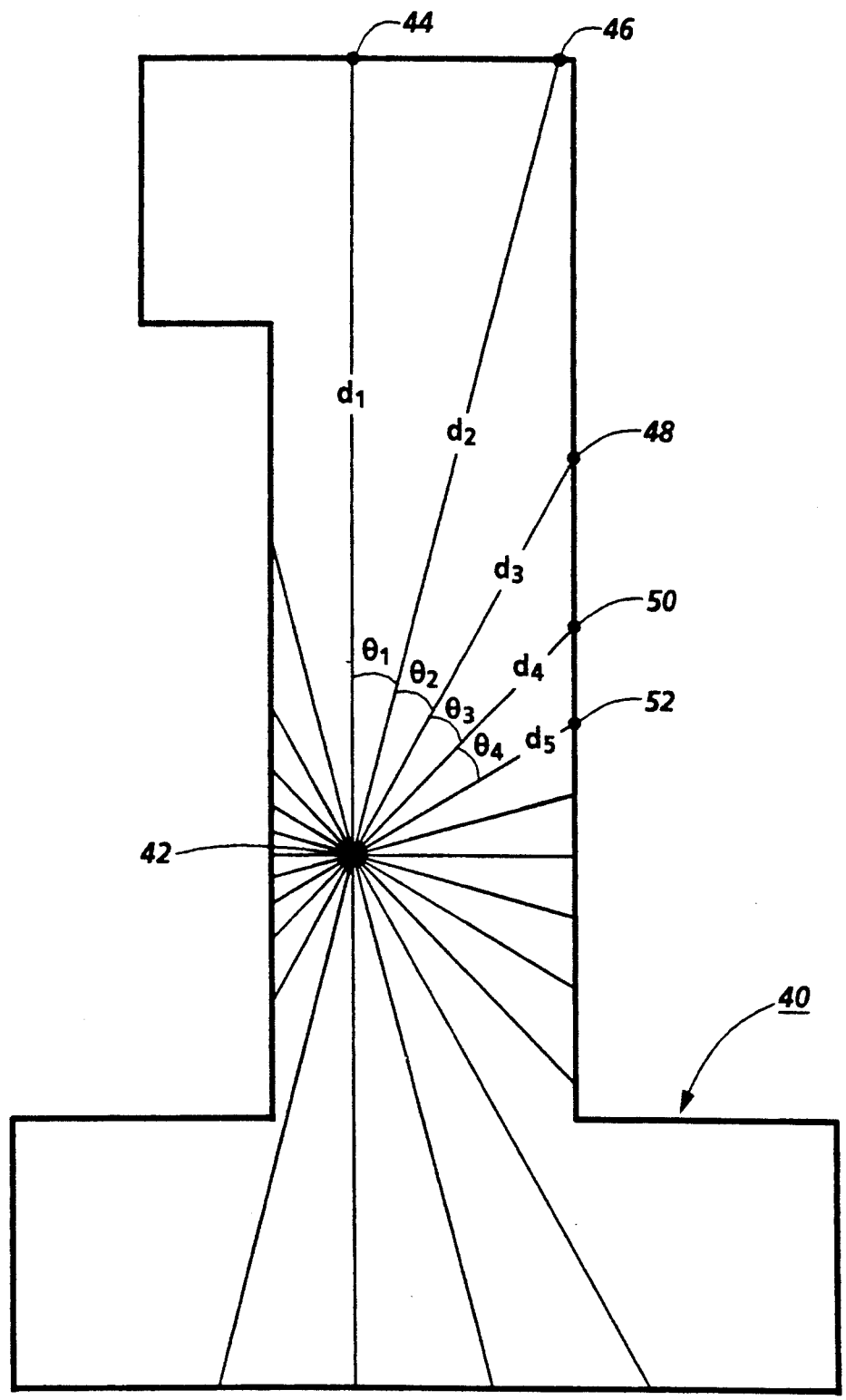
FIG. 2 is a schematic drawing of part of an image, showing how a blob edge can be detected by measuring distance from a starting location as a function of direction.
Figure 3:
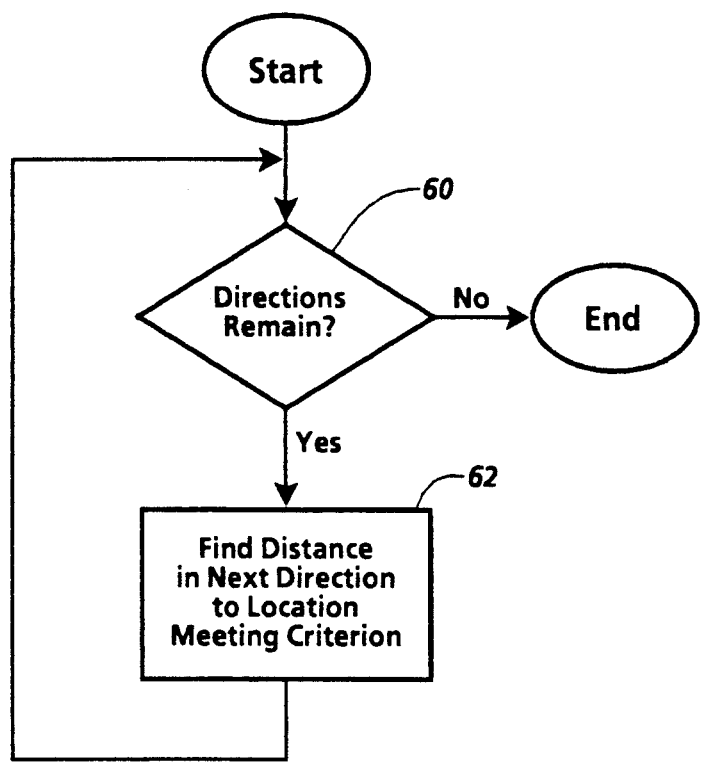
FIG. 3 is a flow chart showing general steps in finding distance as a function of direction.
Figure 4:
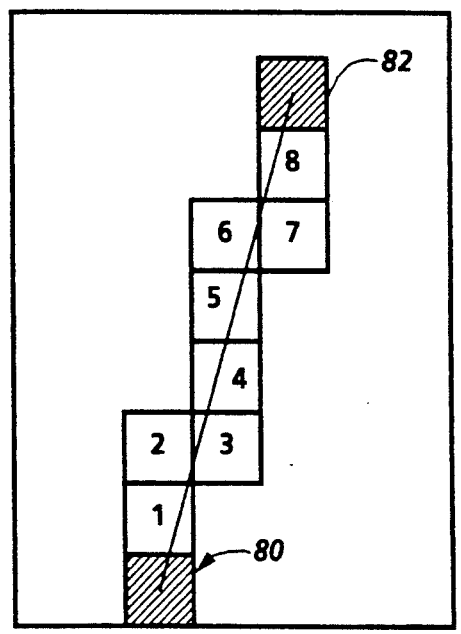
FIG. 4 is a schematic drawing illustrating how distance can be found from a starting pixel to a pixel that meets a criterion in the technique of FIG. 3.

FIGS. 1 through 4 illustrate general features of the invention. FIGS. 1 and 2 show two ways in which measurements can be taken from a location to other locations that meet a criteria. The flowchart of FIG. 3 shows general steps in finding directional measurements. FIG. 4 shows a method of counting pixels from a starting location to an ending location which meets a criterion.

FIG. 1 shows connected component 20 and starting location 10. Distance measurements are made between the starting location and various locations that meet an edge criterion, depending on the direction from the starting location.

From location 10, a first distance $d_1$ is measured to an edge criterion along a line at a first direction to location 22 where the line meets an edge. A second distance, $d_2$, is measured along a line at a second direction separated by an angle of $\theta_1$ from the first direction to location 24 where the line meets an edge. Distance $d_3$ to location 26 is measured along a line at a third direction separated by an angle of $\theta_2$ from the second direction, and distance $d_4$ to location 28 is measured at a fourth direction separated by an angle of $\theta_3$ from the third direction.

Distance $d_5$ is measured along a line in a direction separated by an angle of $\theta_4$ from the fourth direction. However, the line in this direction does not intersect the connected component. For efficiency, the distance in this case can be measured until it reaches an arbitrarily determined limit, such as a dimension of an image, a multiple of the character size in pixels, or other appropriate value.

The distance in each direction is recorded after it is measured. The measurements can be made serially around starting location 10 until the direction returns to the first direction or distances could be measured in parallel. The angles of separation between directions can have equal values, $\theta_i = (360°)/n$, where n is the number of directions in which distance is measured.

FIG. 2 shows how measurements can be taken from inside connected component 40. Starting location 42 is located within connected component 40. If the criterion is an edge, distances will be measured from location 42 to edge locations on connected component 40, in this case locations 44, 46, 48, 50, 52, and so forth.

FIG. 3 illustrates general steps in serially obtaining distance data. The step in box 60 begins an iterative loop that handles each of a number of directions. In each iteration through the loop, the step in box 62 measures distance in one of the directions from a starting location to a location that meets a criterion. For example, the criterion could be a black pixel, a white pixel, or a distance limit.

FIG. 4 illustrates a method of measuring distance, in this example from starting pixel 80 to ending pixel 82. Pixels crossed by a line between pixel 80 and 82 are checked to determine whether they meet a criteria. When pixel 82 is found to meet the criteria, the distance along the line is a distance measurement for pixel 80 in the direction of the line.

Figure 5:
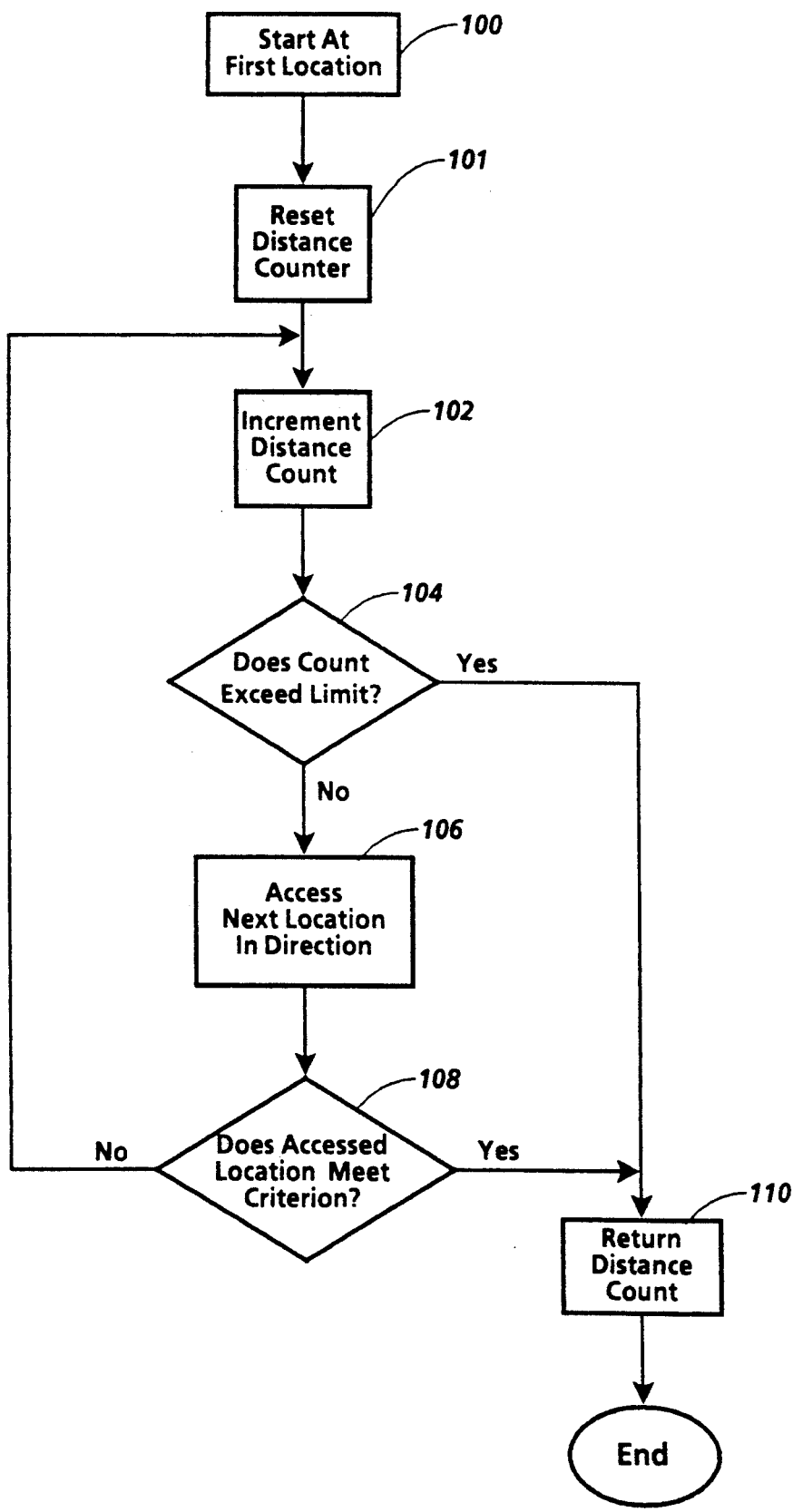
FIG. 5 is a flow chart showing steps for finding distance as shown in FIG. 4.

The flowchart of FIG. 5 shows steps in measuring distance to an ending location. The flowchart of FIG. 6 shows steps in storing the distance data in a data structure.

FIG. 5 shows steps in obtaining data indicating the distance along a direction line from a first location to the nearest location along the line meeting the criteria. The step in box 100 starts at the first location. The step in box 101 resets the distance count to zero. The step in box 102 increments the distance count. The test in box 104 determines whether the distance count exceeds a limit. If it does not, the step in box 106 accesses data defining the location along the direction line at the distance count. The step in box 108 then tests whether the location meets the criterion.

If the location does not meet the criterion, and the distance limit is not exceeded, another iteration begins with the step in box 102. Iterations continue until a location is found that meets the criterion or the distance count exceeds the distance limit. For example, if the criterion is a black pixel, the step of box 108 would test whether the next pixel is black, and the process would continue until a black pixel is found or the distance limit is exceeded. At that point, the step in box 110 returns the distance count, which indicates the distance to the nearest black pixel or the distance limit.

Figure 6:
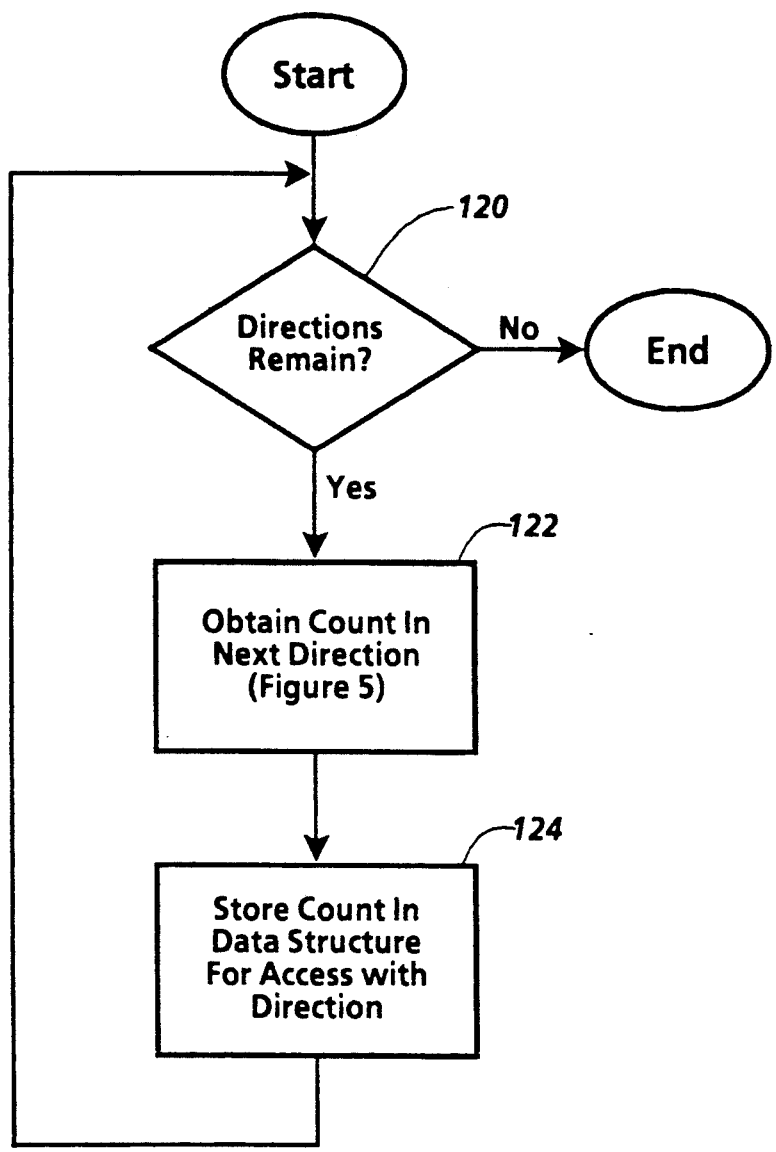
FIG. 6 is a flow chart showing steps that produce a data structure with distance as a function of orientation using the steps in FIG. 5.

FIG. 6 shows general steps in storing distance data for a pixel in a data structure. The step in box 120 begins an iterative loop that handles each of a number of directions. In each iteration, the step in box 122 measures distance data by obtaining a count in the next direction from the pixel, such as by following the steps in FIG. 5. Then the step in box 124 stores the distance data in a data structure in memory so that it can be accessed with the direction for which it was obtained. When distances in all directions have been measured, the data structure for the pixel is complete, and may then be either used or stored.

Figure 7A:
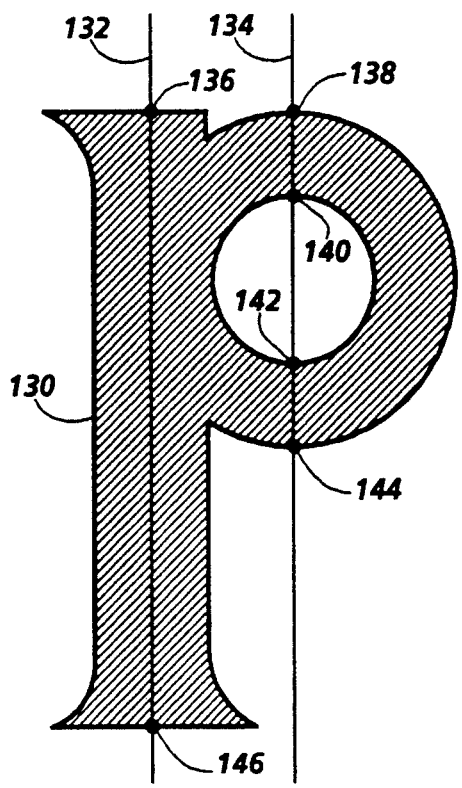
FIGS. 7A and 7B each show how a character can be histogrammed with prior art techniques, to illustrate a type of aliasing.
Figure 7B:
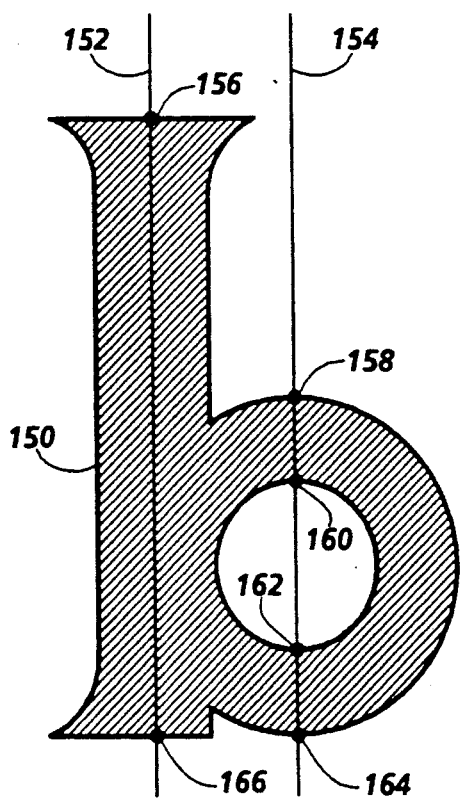

FIGS. 7A and 7B illustrate a common problem with aliasing in similar characters using conventional projection histogramming techniques.

FIG. 7A shows a character 130, an instance of "P", with vertical lines 132 and 134 projected through the character. Line 132 enters the top of the character at pixel 136 and exits at the bottom at pixel 146. Line 134 enters the character first at pixel 138, then exits at pixel 140, reenters at pixel 142, and exits again at pixel 144. FIG. 7B shows character 150, an instance of "b" similarly shown with vertical lines 152 and 154, projected through the character. Line 152 enters the top of the character at pixel 156 and exits at the bottom at pixel 166. Line 154 enters the character first at pixel 158, then exits at pixel 160, reenters at pixel 162, and exits again at pixel 164. If the information indicates the number of black pixels intersected by the line, the information gathered about the two characters appears identical.

Figure 8A:
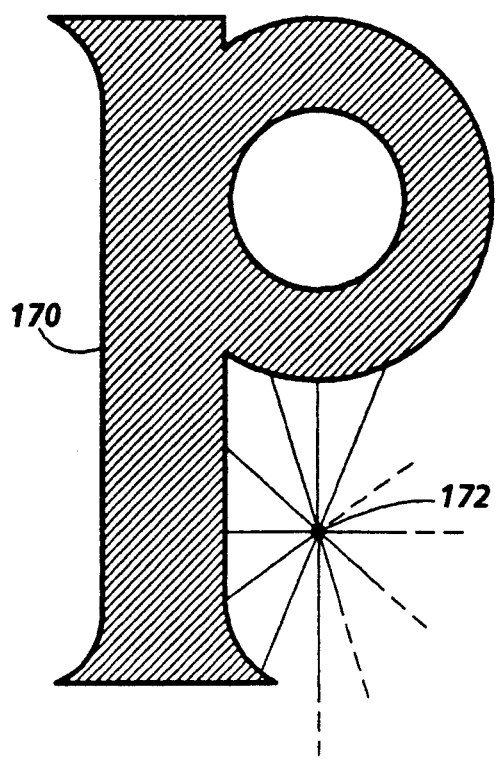
FIGS. 8A and 8B each illustrate how a character can be detected by finding distance as a function of direction to avoid aliasing.
Figure 8B:
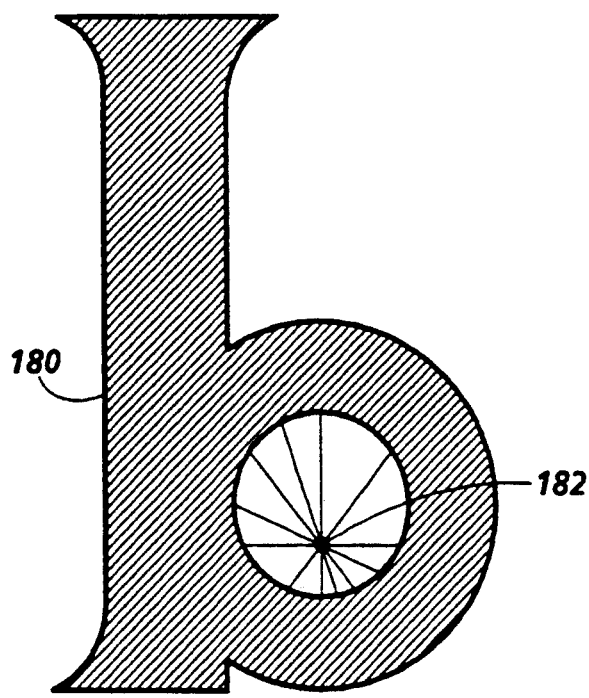

FIGS. 8A and 8B show how distance data avoids the aliasing problem in FIGS. 7A and 7B. Distance data obtained for similar pixels near each of the characters is very different.

From pixel 172 near "P" character 170, the distance measurements in some directions follow the lower portion of the character. In other directions, the distance measurements continue to the distance limit, or until reaching another object. In contrast, distance measurements in all directions from pixel 182 inside the loop of "b" character 180 follow the loop's inner edge. Furthermore, distance measurements from a pixel directly above pixel 182 but outside the loop would be similar to those from pixel 172, but would continue to the distance limit in some different directions.

Figure 9A:
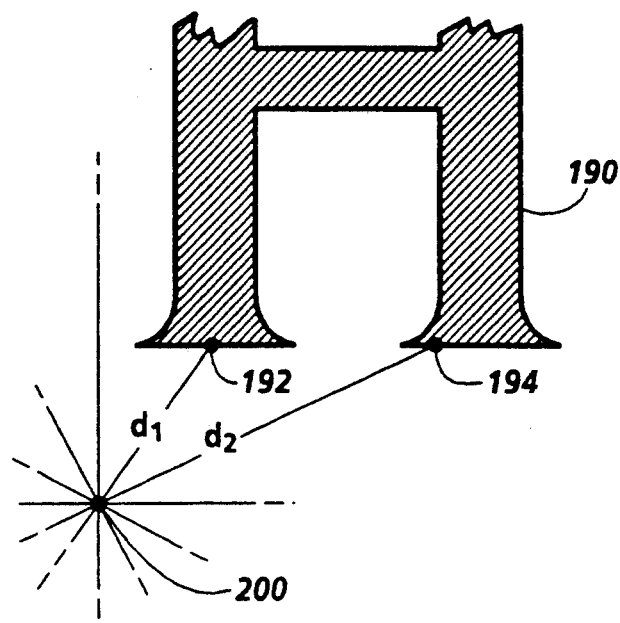
FIGS. 9A and 9B each show a character that is detected by finding distance as a function of direction, but with different angles separating adjacent directions.
Figure 9B:
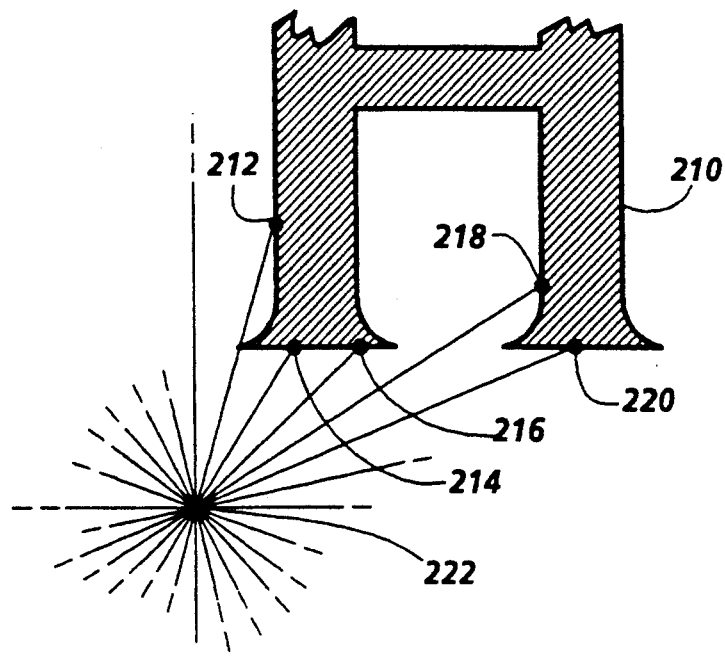

The profiles of the distance measurements obtained from similar pixels in FIGS. 8A and 8B are easily distinguishable. FIGS. 9A and 9B illustrate a benefit of measuring distance at a large number of directions. For example, FIG. 9A shows character 190. Distances from pixel 200 are measured in 12 directions. Distance $d_1$ is measured to pixel 192 on the character edge. Distance $d_2$ is measured to pixel 194 on the character edge. Additional measurements are taken around pixel 200. In this example, no sample is taken between pixel 192 and 194, and the distance data includes no information that there is a gap in the character between these two pixels.

FIG. 9B shows a similar character 210. In this case, measurements are taken from pixel 222 in 28 directions. From pixel 222, distance $d_1$ is measured to pixel 212 on an edge of character 210. Additional distances $d_2, d_3, d_4$, and $d_5$ are measured to pixels 214, 216, 218, and 220, respectively. In FIG. 9B the distance data provides much more information about character 210 than the distance data about character 190 in FIG. 9A. This information indicates the approximate width of the character, the existence of a gap in the bottom of the figure, and the approximate width of the gap.

Figure 10:
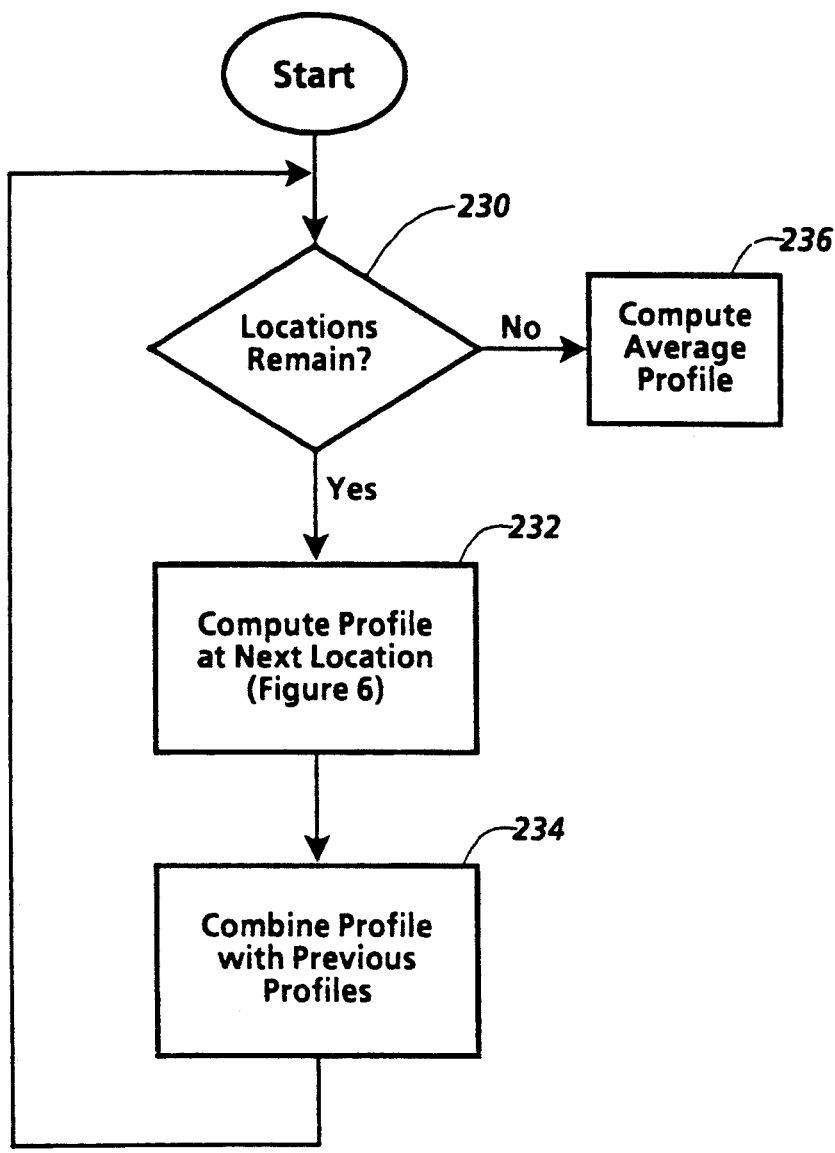
FIG. 10 is a flow chart showing general steps in obtaining a profile for an image by combining data from FIG. 6.

FIG. 10 shows steps in combining profiles of the image at a plurality of selected locations to obtain a profile of distance as a function of direction for an image that includes the locations.

The step in box 230 begins an iterative loop by determining whether locations remain to be handled. The profile is obtained for the next location in the step in box 232, such as by following the steps in FIG. 6 to produce a profile data structure. Then the step of box 234 combines the profile with previous profiles, such as by adding the distance data in each direction. Alternatively, if profiles have been obtained and combined for all locations, the average profile of distance in each direction could be obtained in the step in box 236 by dividing the sum of distances in each direction by the number of locations.

Figure 11:
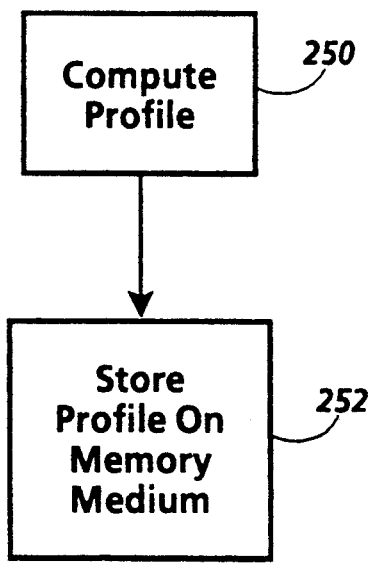
FIG. 11 is a flow chart showing general steps in storing a profile from FIG. 10 on a storage medium.
Figure 12:
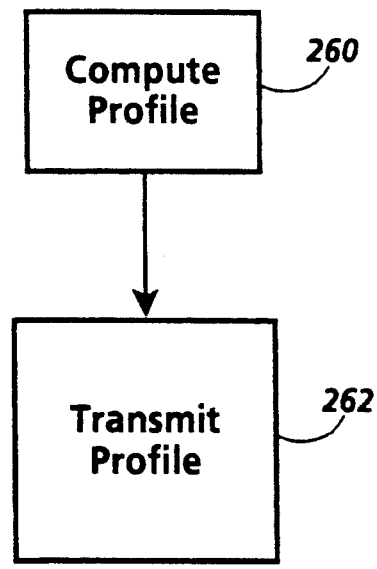
FIG. 12 is a flow chart showing general steps in transmitting a profile from FIG. 10.

FIGS. 11 and 12 show steps in using profiles generated by the steps in FIG. 6 or 10. FIG. 11 illustrates that the profile obtained in the step of box 250 can be stored on a memory medium, by the step in box 252. This memory medium could be a rigid disk, floppy disk, ROM, CD-ROM, RAM, or any suitable memory medium. In FIG. 12, the profile obtained in the step of box 260 is transmitted by the step in box 262 over a transmission medium, such as a network, a telephone line, a radio link, or other suitable medium.

C. An Implementation

Figure 13:
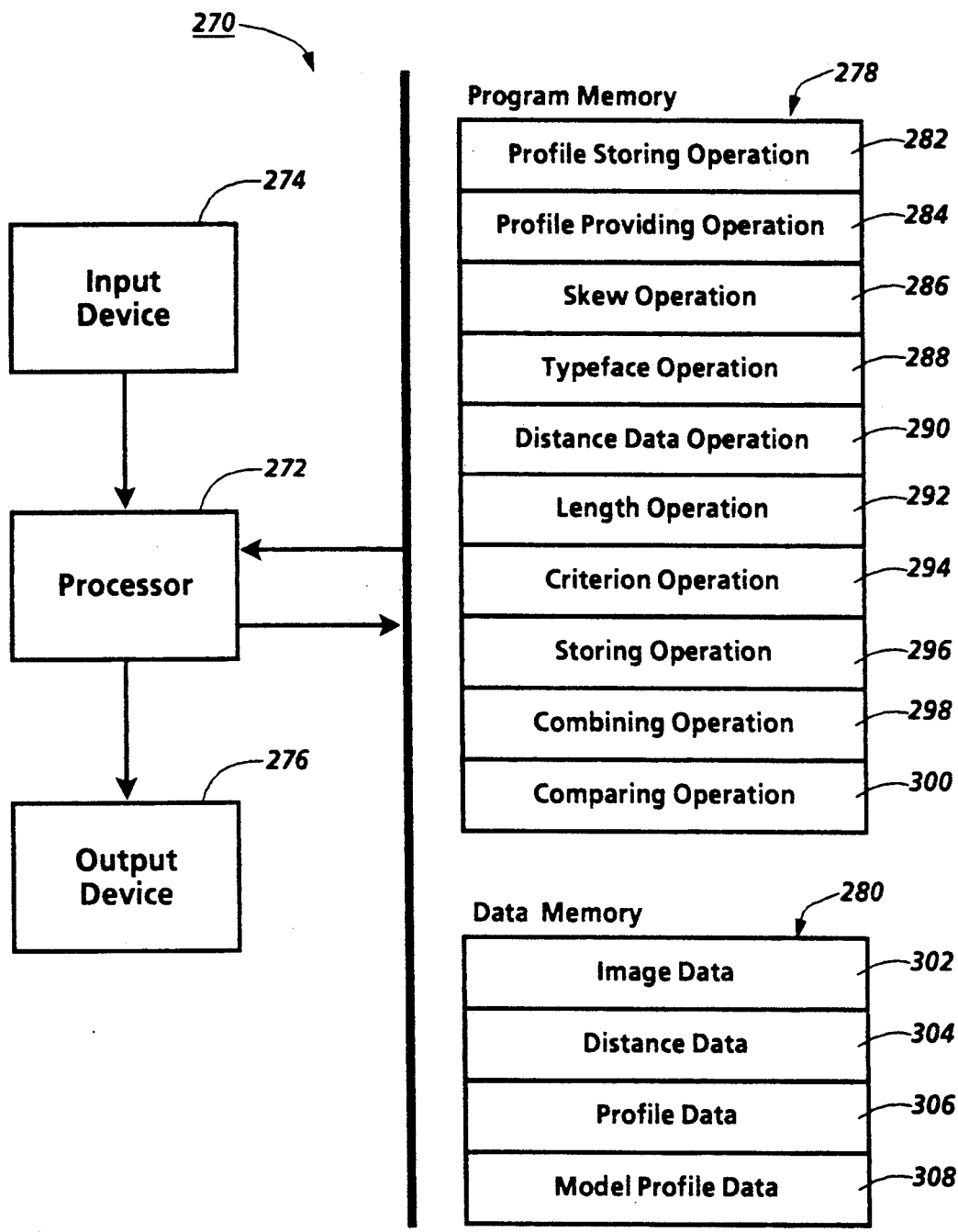
FIG. 13 is a schematic block diagram showing components of a system implementing image processing using distance as a function of direction.

FIG. 13 shows system 270 in which the invention is implemented. Processor 272 is connected for receiving input data from input device 274 and for providing output data to output device 276. Processor 272 can be the CPU of a workstation, and input device 274 and output device 276 can be I/O devices. For example, input device 274 can be an image input device such as a scanner or a digital image source. Also input device 274 can provide a connection to a peripheral storage device or other storage or transmission medium from which model profiles that indicate distance as a function of direction can be received. Similarly, output device 276 can be a device for providing data obtained by processor 272, such as data indicating a direction, data indicating a typeface, or a profile that indicates distance as a function of direction in an image, to a storage or transmission medium.

During operation, processor 272 executes instructions from program memory 278 and accesses data memory 280 to read and write data. Program memory 278 stores instructions for a number of operations. Data memory 280 stores data structures as shown and can also temporarily store intermediate data used by processor 272 in performing its operations.

Profile storing operation 282 receives a set of profiles through input device 274 and stores the profiles in data memory 280. Similarly, profile providing operation 284 provides a newly produced profile to output device 276.

Skew operation 286 obtains data indicating the skew of lines of characters in an image. Typeface operation 288 obtains data indicating the dominant typeface of characters in an image. These operation can each call distance data operation 290 with appropriate parameters to obtain distance data for a set of starting pixels and a number of directions. The parameters from skew operation 286 can request distance data indicating a distance across white pixels to an edge and the parameters from typeface operation 288 can request distance data indicating a distance across black pixels to an edge.

Distance data operation 290 can call length operation 292, criterion operation 294, and storing operation 296 in producing the requested distance data. Length operation 292 obtains length data indicating a length along a line from a starting pixel in a given direction. Criterion operation 294 uses the length data to determine whether a pixel at the indicated length from the starting pixel meets a criterion, such as an edge criterion. When a pixel meeting the criterion is found, storing operation 296 stores the length data for the pixel, which is the distance data for the direction.

Storing operation 296 can store the length data so that it can be accessed using data indicating the direction.

Combining operation 298 is called by skew operation 286 and typeface operation 288 to combine the distance data for each direction for all the starting pixels to obtain combined distance data for each direction, producing a profile of distance as a function of direction. Comparing operation 300 is called by typeface operation 286 to compare a profile produced by combining operation 298 with model profiles stored by profile storing operation 282.

Image data 302 in data memory 280 includes data indicating a value for each image pixel. It can be stored by an image storing operation (not shown). Criterion operation 294 accesses a pixel's value in image data 302 in determining whether the pixel meets the criterion. Storing operation 296 stores distance data 304 as described above. Combining operation 298 accesses distance data 304 and produces profile data 306. Profile storing operation 282 stores model profiles 308. Profile data 306 and model profiles 308 are accessed by comparing operation 298, and profile providing operation 284 also accesses profile data 306.

Figure 14A:
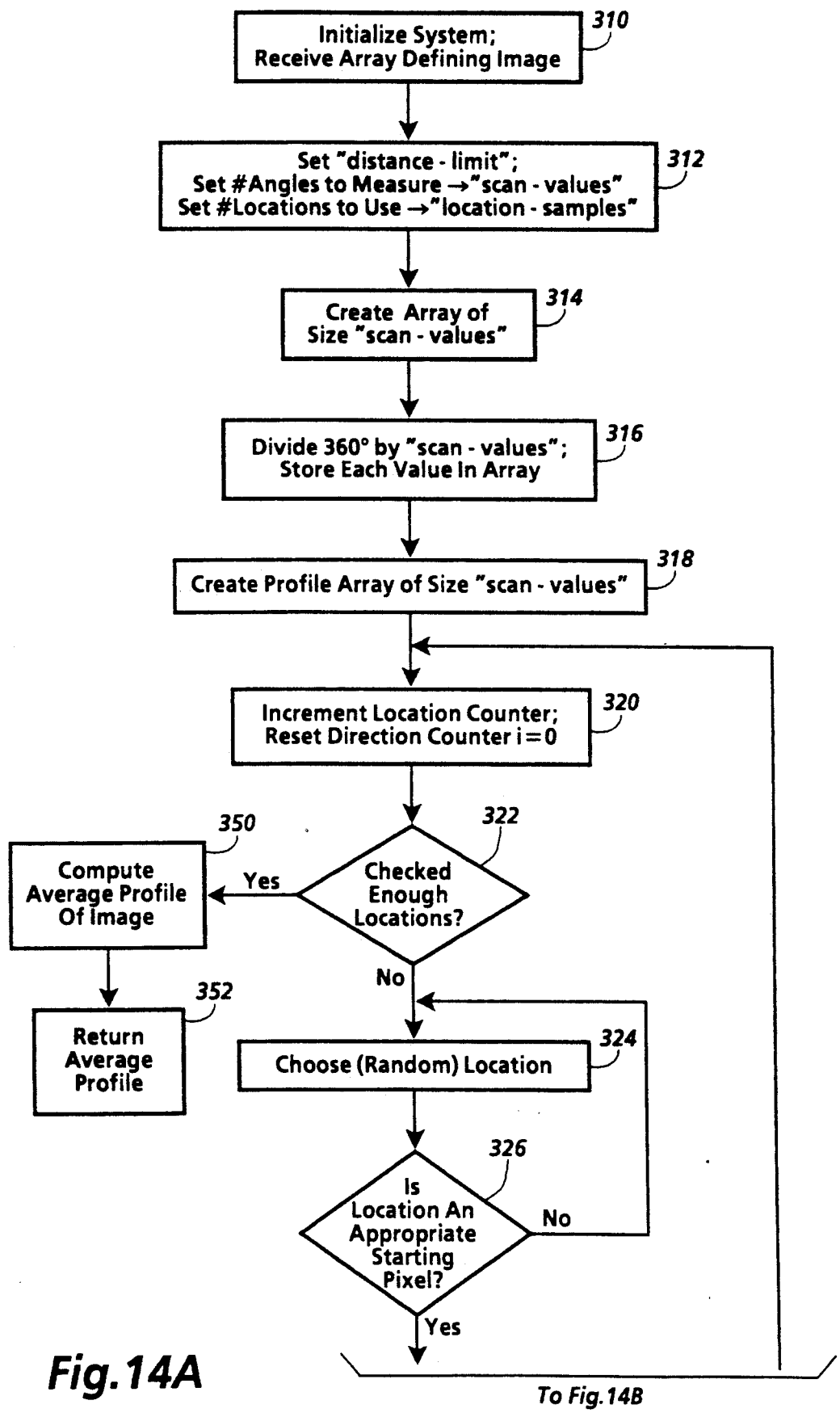
FIGS. 14A and 14B are a flow chart showing steps in obtaining distance as a function of direction.
Figure 14B:
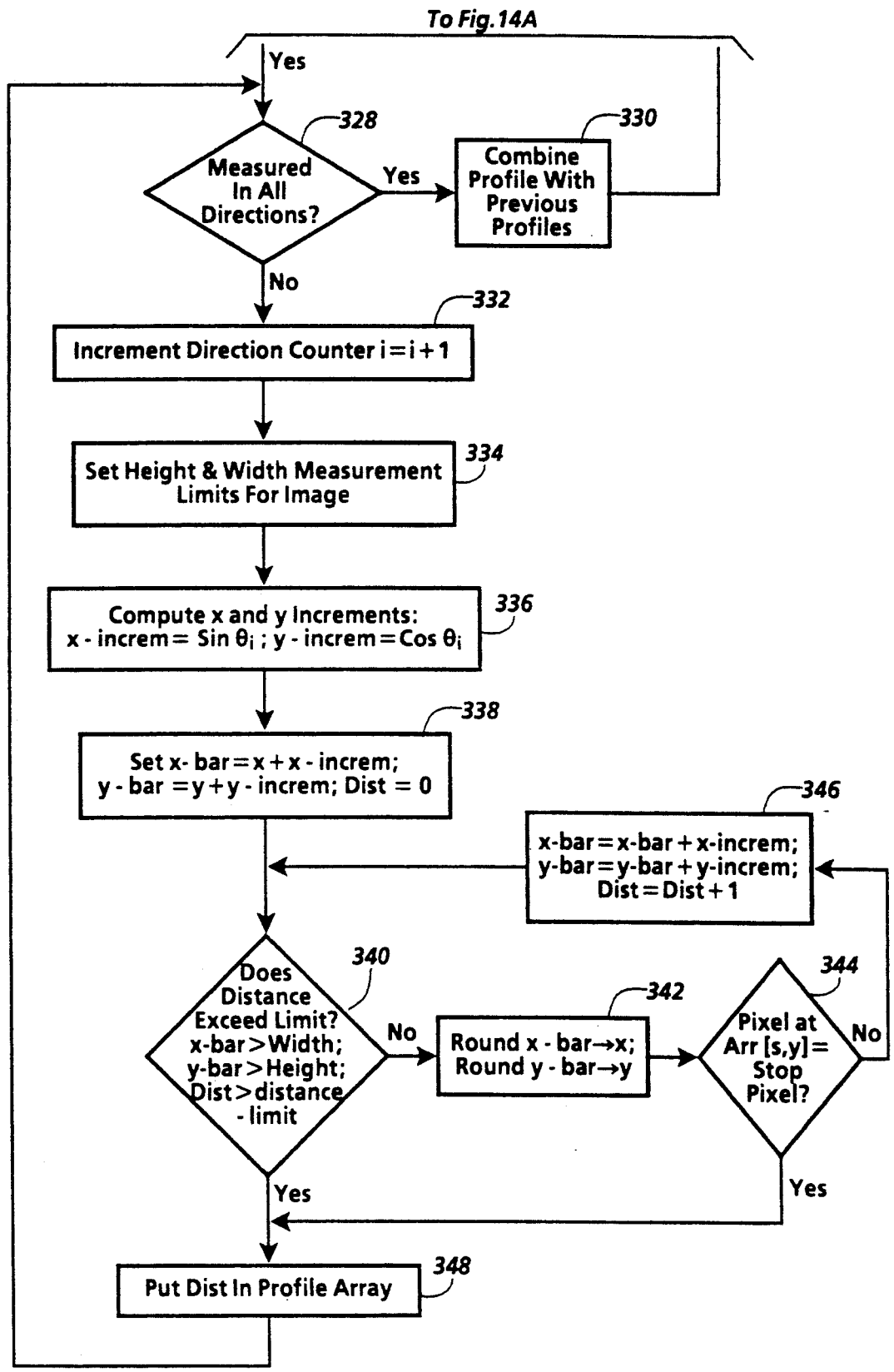
Figure 15:
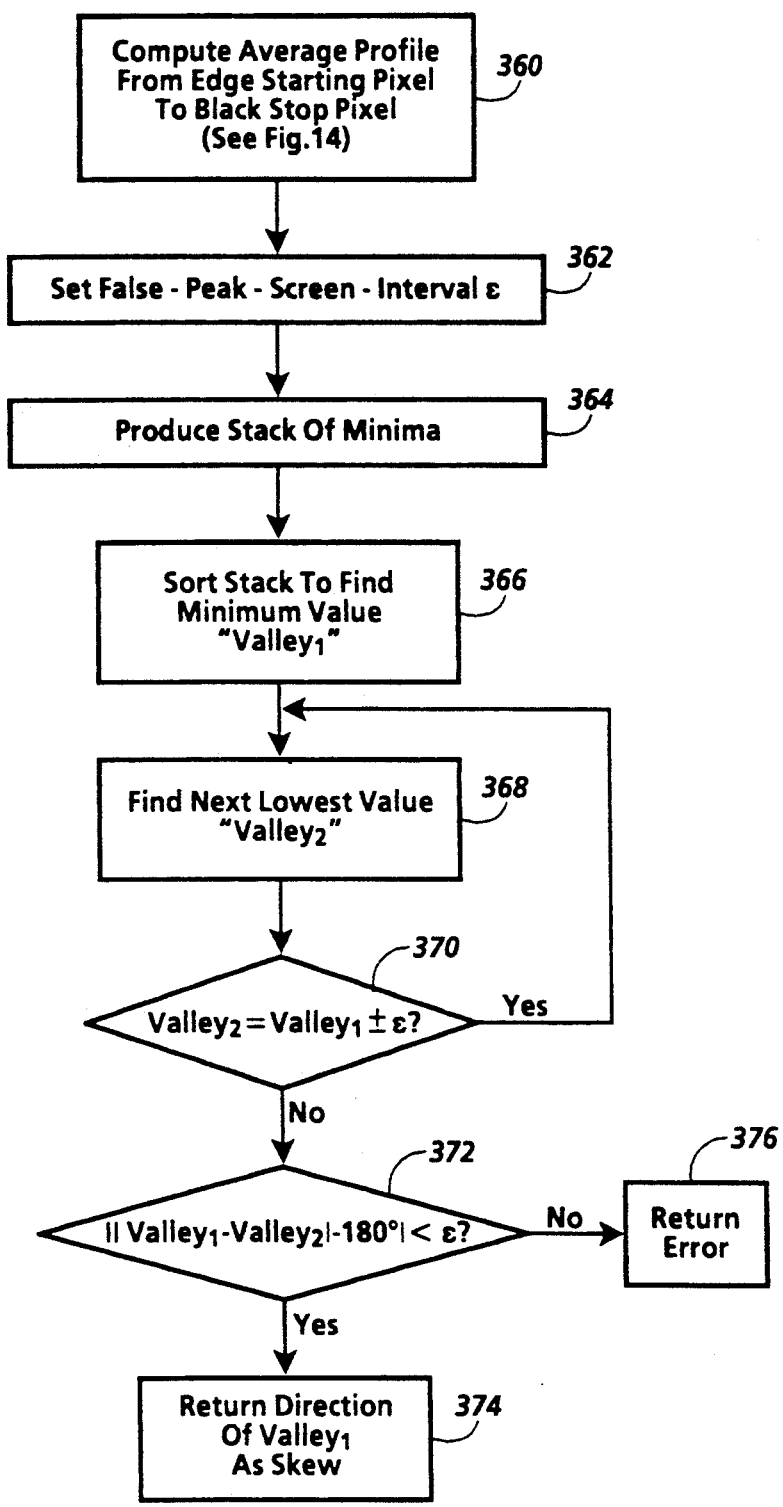
FIG. 15 is a flow chart showing steps in detecting skew using distance as a function of direction.
Figure 16:
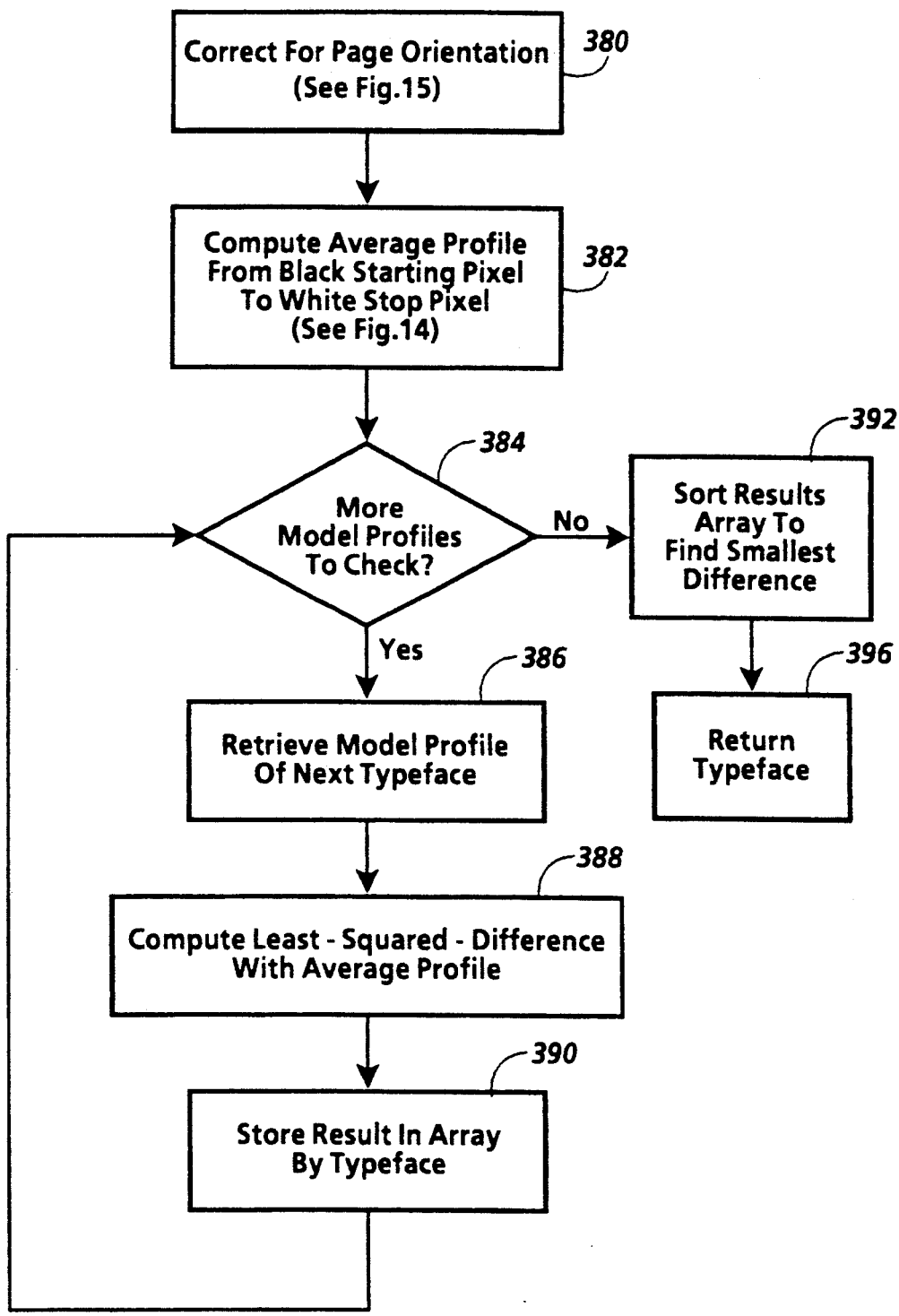
FIG. 16 is a flow chart showing steps in detecting dominant typeface using distance as a function of direction.

FIGS. 14A-16 show some implementations of the techniques of the invention. FIGS. 14A and 14B show the general technique of producing a distance as a function of direction profile. FIG. 15 uses the average profile to find the skew of text in an image. FIG. 16 uses the average profile to determine the dominant typeface of the text in the image.

FIGS. 14A and 14B show a method of determining the average profile of the distance as a function of direction for an image. The step in box 310 initializes the system and loads the image array which defines the image to be analyzed. If the image data is obtained in a different format than appropriate for the steps being performed, such as in a disk file format or a scanner output format, it must be converted into an array or other appropriate format. The step in box 312 sets constants, including distance-limit; scan-values, indicating the number of directions to be used; and location-samples, indicating the number of locations to be used in characterizing the image.

The constant distance-limit may be set to a value sufficiently greater than the interline spacing of the image to detect distances between adjacent lines of text. For example, in one set of images the technique has worked well with distance-limit set to 70.

Because the directions are obtained by dividing 360° by scan-values, a larger value for scan-values detects image characteristics with greater resolution. Satisfactory resolution has been obtained for some characteristics with scan-values set to values around 24.

Satisfactory results for some characteristics have been obtained with location-samples set to 1000, to 3000, and, in some cases, to 5000. Greater values for location-samples require more computation but may not achieve greater accuracy once an appropriate level of statistical significance has been reached. The resolution of the image received and the particular characteristic being measured may affect the value required to obtain satisfactory measurements. Factors useful in determining an appropriate value for location-samples are described in copending, coassinged U.S. patent application Ser. No. 07/737,956, entitled "Image Analysis Based on Location Sampling," incorporated herein by reference.

Appropriate values of scan-values and location-samples may be determined experimentally or by statistical analysis. In general, a satisfactory value for a given measurement on a given image can be obtained by increasing each of these constants until further increase does not improve reliability of results.

The step in box 314 creates an array with scan-values size. This array will be used to store the scan directions of a segmented circle. To obtain the scan directions, the step in box 316 divides the value of the circle, 360°, by scan-values. Each direction can be stored in the array as an angle offset from some direction such as vertical down (i.e., $0° = \downarrow$).

The step in box 318 creates another array, the profile array. This array also has a size of scan-values, and will be used to store the distance measurements for each direction.

The step in box 320 resets the direction counter to zero, and increments the location counter to keep track of the number of locations sampled. The step in box 322 checks for when the location counter reaches location-samples.

If the desired number of locations have not yet been sampled, the step in box 324 chooses another location. This may be a random or pseudo-random choice. The step of box 326 checks to make sure that the location is an appropriate choice for a starting pixel, depending on the application. For some applications, the starting pixel should be in a connected component. Additional properties, such as whether the pixel is on the edge of a component, may also be desired. For example, for detecting the skew of an image, a pixel located on an edge of a component might be used as the starting pixel. For determining the typeface of text in an image, the starting pixel may be chosen to be an edge pixel or any black pixel.

If the chosen pixel does not have the desired properties, no measurements are made from the pixel and the system returns to box 324. If the pixel is appropriate, the step in box 328 checks whether scan-values directions have been measured. If not, the step in box 332 increments the direction counter for a new direction. The step in box 334 sets limits for the height and width of the image array for the chosen pixel. These may indicate the outside edges of the image, so that measurements need not be taken beyond the edges of the image. The step in box 336 computes increments along the x and y axes for each increment along a line in the new direction. The step in box 338 starts the variables x-bar and y-bar at the first increment from the starting pixel along this line, and resets the distance counter dist.

The step in box 340 checks whether the length from the starting pixel is beyond any of the width, height, or distance limits. If it is not, the current values of x-bar and y-bar are rounded to integers in order to access a pixel's data item in the image array. The step of box 344 checks to see if the pixel at that location meets the criterion for stopping. If it does not, the step in box 346 increments x-bar and y-bar and dist, and returns to box 340 to check for the limits. If the pixel in the array at box 344 meets the stop pixel criterion or if a limit is exceeded, distance data dist indicating length from the starting pixel is stored in the profile array by the step in box 348. The system then returns to box 328 until the distance has been measured at scan-values directions.

If all the directions have been measured, the profile is combined with previous profiles in box 330 for all the locations thus far, and the location counter is incremented in box 320. If location-samples locations have been sampled at the step in box 322, the step in box 350 computes the average profile for the image from the sum of profiles. The average profile is returned in the step in box 352.

FIG. 15 shows an operation that uses the average profile obtained in FIGS. 14A and 14B to determine the skew of the image. In box 360, the average profile is computed using the technique of FIG. 14. For this example, each starting pixel can be a black edge pixel, and each stop-pixel another black pixel. The step in box 362 sets a value for the false-peak-screen-interval, $\epsilon$. This constant is a margin of error allowing for peaks that might occur at directions very close to a maximum peak value. This constant can be set to 10 degrees, for example. The step in box 364 finds each local minimum and, for each minimum, adds an entry to a stack indicating the minimum value. The step in box 366 sorts the stack according to the value at each minimum to find the minimum value in the stack. The direction, $valley_1$, that corresponds to this minimum value in the array is considered the skew of the image.

To check whether $valley_1$ is in fact the skew, the step in box 368 finds the next lowest value in the array, at a direction $valley_2$. The step in box 370 checks whether $valley_2$ is not within the false-peak-screen-interval $\epsilon$ of $valley_1$. If it is, the box in 368 picks the next minimum value for $valley_2$. When a $valley_2$ is found which doesn't fall into the $\epsilon$ interval around $valley_1$, the step in box 372 check whether the second minimum $valley_2$ is approximately 180° from the first minimum $valley_1$, showing the skew in the opposite direction across the image. When this is found, the step in box 374 returns the skew direction, $valley_1$. If the difference between $valley_1$ and $valley_2$ does not fall into the range of $(180° - \epsilon)$ to $(180° + \epsilon)$, an error is detected and returned in the step in box 376. In this case it is likely that the image being analyzed is not a text image.

Additional details about skew detection are set forth in copending, coassigned U.S. patent application Ser. No. 07/737,863. entitled "Coarse and Fine Skew Measurement," incorporated herein by reference.

FIG. 16 shows an operation that uses the average profile to determine the dominant typeface of text in an image. The step in box 380 uses the technique of FIG. 15 to obtain the skew of the image, which can be taken into account in later computations, or can be used to deskew the image. The step in box 382 computes a new average profile for the image, this time using black pixels as starting pixels, and measuring distance to the nearest white pixel in each direction. Edge pixels could alternatively be used as starting pixels. Model profiles for known typefaces are stored in data memory. Box 384 begins an iterative loop that continues as long as there are more model profiles to check against the profile of the current image. The step in box 386 retrieves the model profile of the next typeface. The step in box 388 computes the least-squared-distance between the model profile and the current average profile. This can be done using the formula:

$$\min_{x \in R} \sum_{i=0}^{i=\text{scan-values}} (a(i) - b(i) - x)^2$$

to obtain a sum of squares, of which the square root can then be obtained as a measure of distance between the model profile and the current average profile. Other standard comparison techniques could be used, such as obtaining a difference in absolute values or any other conventional measure of distance.

The result of the calculation is stored in the step in box 390 in a result array according to the typeface. If there are no more typeface model profiles to check in box 384, the step in box 392 sorts the result array to find the smallest difference. An identifier of the typeface with the smallest difference is returned in the step in box 396.

Additional details about dominant typeface identification are set forth in copending, coassigned U.S. patent application Ser. No. 07/737,948, entitled "Image Analysis to Obtain Typeface Information," incorporated herein by reference.

Figure 17:
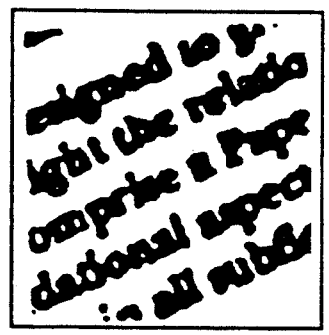
FIG. 17 is a sample of an image of text that is skewed.
Figure 18:
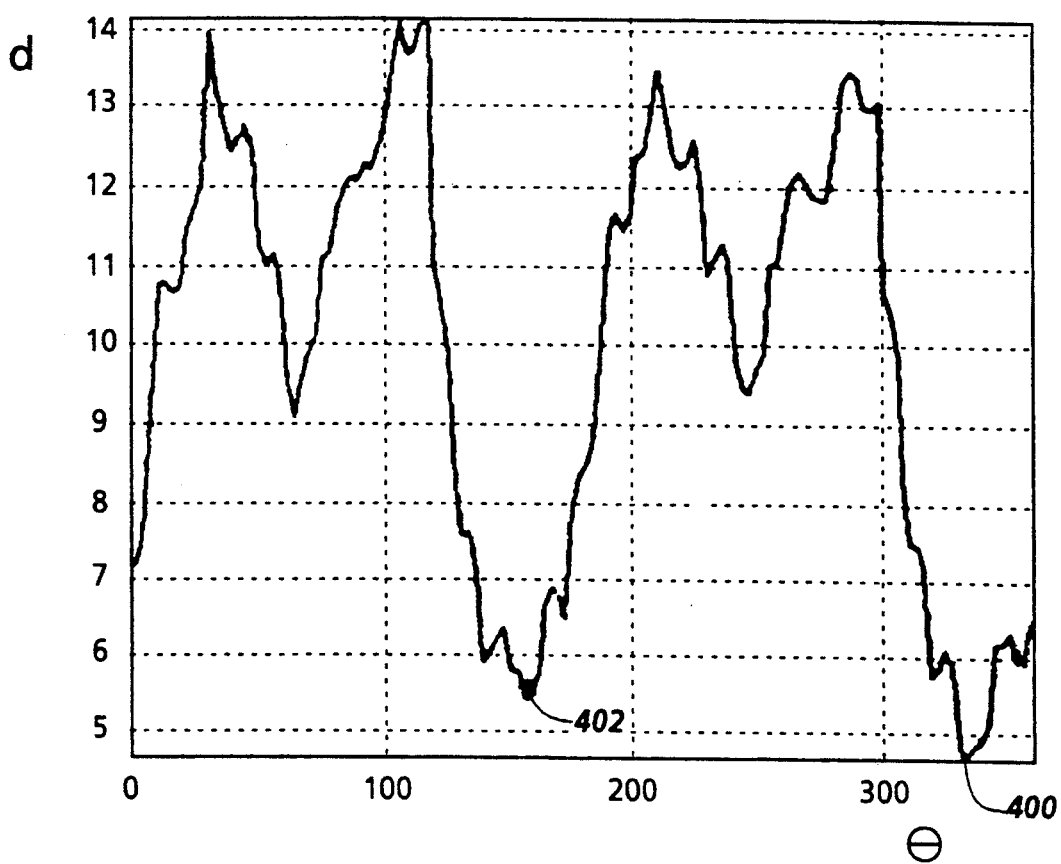
FIG. 18 is a profile of distance as a function of direction for the image of FIG. 17.

FIGS. 17 and 18 show an example using the techniques of FIGS. 14A, 14B, and 15. A profile of average distance as a function of direction is obtained for a sample of skewed text shown in FIG. 17, using the technique of FIGS. 14A and 14B. FIG. 18 is the plot of the mean intercomponent distance as a function of direction, for the text. The statistics are computed over the sample at a set of 128 different directions distributed over 360°. The point 400 shows a minimum at about 330 degrees, which is the approximate skew of the text sample on the page. The second minimum 402 is at about 150 degrees, indicating the 180 degree difference of the parallel line in the opposite direction.

FIGS. 19-22 show examples using the techniques of FIGS. 14A, 14B, and 16. A profile of average distance as a function of direction is obtained using the technique of FIGS. 14A and 14B on a sample of text shown in FIG. 19, an example of Bookman typeface. FIG. 20 is a plot of the profile for Bookman typeface. FIG. 21 shows a sample of text in Avant Garde typeface. FIG. 22 shows a plot of the average distance as a function of direction profile of the sample of Avant Garde, obtained using the technique of FIGS. 14A and 14B. These profiles can be compared with model profiles or with each other as described above.

D. Other Implementations

Figure 23:
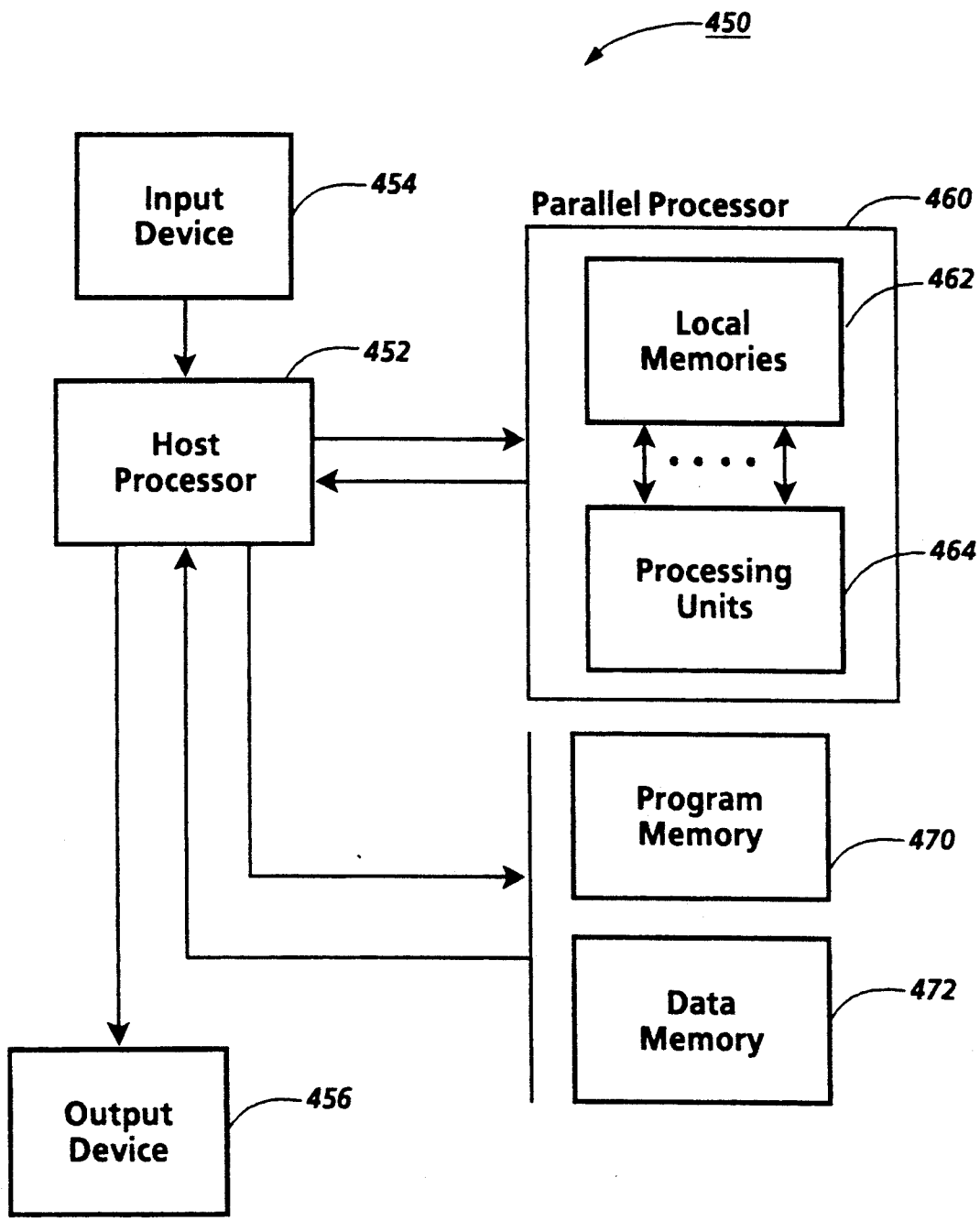
FIG. 23 is a schematic block diagram of a system that includes a parallel processor for finding distance as a function of direction in an image.

The invention could be implemented in many other ways and could be implemented in a wide variety of systems. FIG. 23 shows an implementation that includes a parallel processor.

Figure 24A:
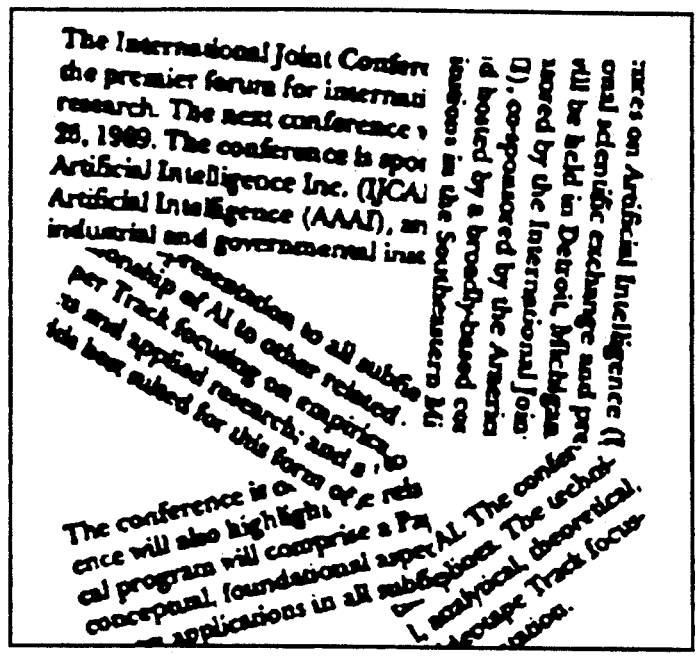
FIG. 24A is an image of text with regions at different skew directions.
Figure 24B:
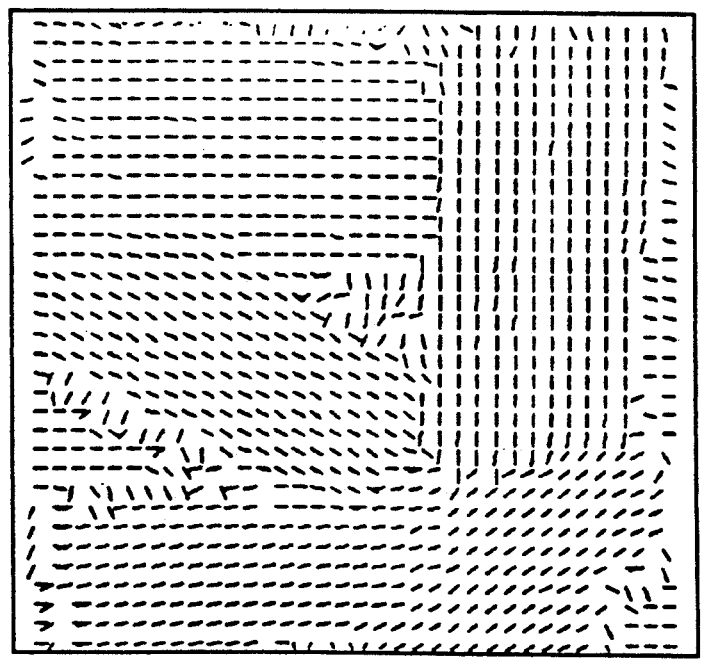
FIG. 24B is an image with short lines indicating skew direction for the image of FIG. 24A.

FIG. 23 shows system 450 resembling the system of FIG. 13. Syste, 450 includes host processor 452 connected to receive data from input device 454 and to provided data to output device 456. Host processor 452 is also connected to exchange data with parallel processor 460, which could, for example, be a Connection Machine from Thinking Machines Corporation. Parallel processor 460 includes processing units 462, each with local memory 464. Data defining an image can be stored in local memory 464 so that each pixel's value is stored in a respective processing unit's local memory. Conceptually, each pixel is handled by a separate real or virtual processing unit. Host processor executes instructions from program memory 470 and accesses data memory 472 in performing image processing, as described above in relation ot FIG. 13. Host processor 452 executes a distance data subroutine that includes operating each pixel's respective processing unit in parallel to obtain distance data indicating distance from the pixel in a direction to another pixel that meets a criterion. FIGS. 24A and 24B illustrate an additional feature of the parallel implementation that could be useful in dividing an image into regions, each of which has a prominent value for an image characteristic. FIG. 24A shows an image of text that includes five regions, each of which includes text with a different prominent skew than the text in the other regions. FIG. 24B shows an image derived from the image of FIG. 24A, in which short lines are oriented parallel to the local skew at representative pixels distributed evenly throughout the image.

The parallel implementation can find the local skew as illustrated in FIG. 24B after obtaining a profile of distance as a function of direction for each pixel. A processing unit for a given pixel can obtain data about the profiles of a number of nearby pixels from the respective processing units. For example, the nearby pixels could include all pixels in a neighborhood of $M \times M$ pixels centered at the given pixel. A processing unit can then combine the profiles of the pixels in its neighborhood to obtain a profile indicating distribution of distance as a function of direction for the neighborhood, such as by separately averaging the distances in each direction. This profile can then be analyzed to obtain the local skew, as represented in FIG. 24B.

The technique illustrated in FIGS. 24A and 24B could also be included in a serial implementation by appropriate modifications of the techniques described above. For example, when a profile of distance as a function of direction is obtained for a selected pixel, the profile could be distributed and combined with an accumulator profile for each of the other pixels in the pixel's $M \times M$ neighborhood. This would be a constant time ($M^2$) operation that would produce an array of local profiles, each for an $M \times M$ neighborhood centered on a respective pixel of the original image. Or, if measurements are made in relation to a sample set of pixels, each measurement could include obtaining a profile for each pixel in a sampled pixel's $M \times M$ neighborhood and the profiles could be combined to obtain a local measurement for the sampled pixel. The sample set of pixels could be selected to obtain an even distribution throughout the image.

The technique illustrated in FIGS. 24A and 24B could be applied to measurements of dominant typeface and other image characteristics for which different regions of an image may have different prominent values. Furthermore, data indicating an image characteristic for the neighborhoods could be analyzed to find edges between regions, allowing division of an image into segments, each of which has a prominent value for a characteristic being measured.

E. Applications

Figure 25:
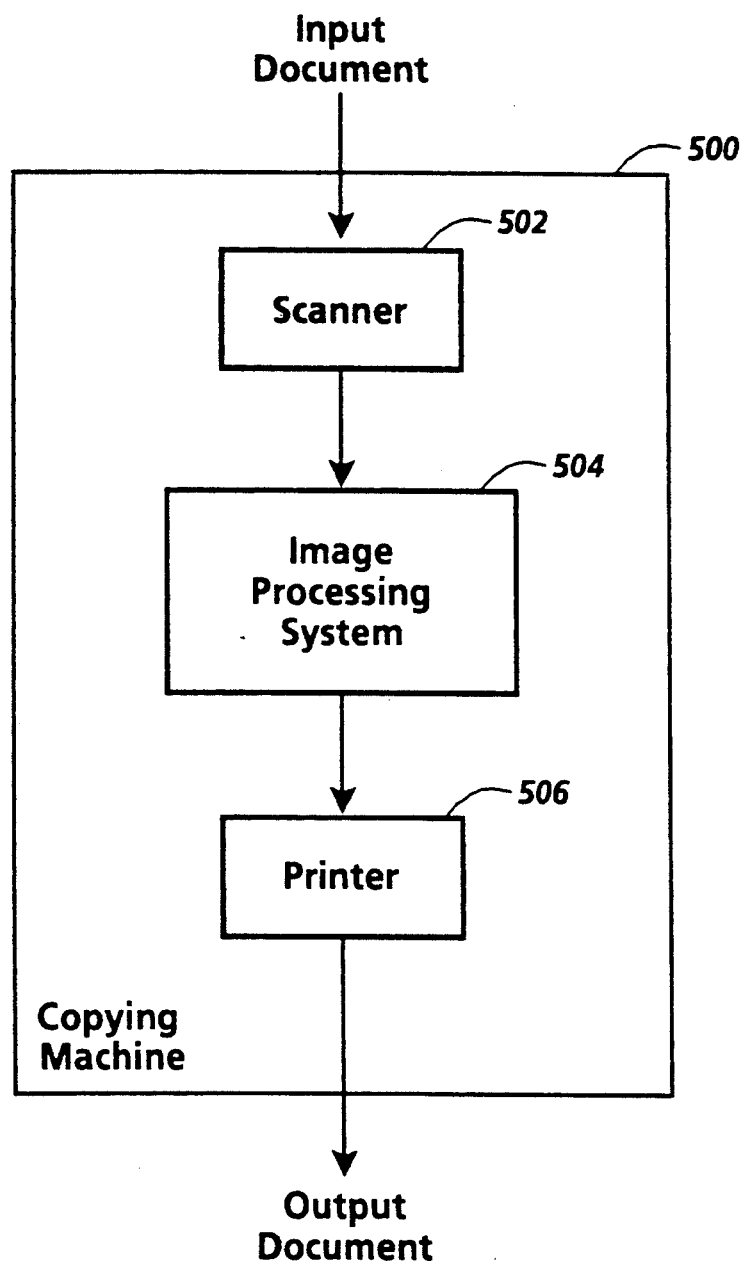
FIG. 25 is a schematic block diagram of a copying machine that includes an image processing system that finds distance as a function of direction.

The invention could be applied in many ways, including the skew detection and dominant typeface identification as described above. FIG. 25 illustrates applications of the invention in a copying machine.

Copying machine 500 includes scanner 502, image processing system 504, and printer 506. Scanner 502 can produce data defining an image of an input document. Image processing system 504 can be implemented as shown in FIG. 13 or in FIG. 23, and can, in addition to detecting skew and identifying dominant typeface, use optical character recognition techniques to identify characters in the document. Image processing system 504 might also apply techniques to detect character size and positioning and to produce data defining a corrected image in which a character in the input document image is replaced by a correct version of the same character from the identified typeface at the appropriate size, position, and skew. The data defining the corrected image could then be provided to printer 506 to print an output document.

F. Source Code

Appendix A is Common Lisp source code implementing some of the features described above. The source code in Appendix A may differ in some respects from the above description, but execution of the source code in Appendix A on a Sun-4 workstation measures distance as a function of direction as described above.

Source code implementing dominant typeface identification is included in copending coassigned U.S. patent application Ser. No. 07/737,948, entitled "Image Analysis to Obtain Typeface Information," incorporated herein by reference. Source code implementing coarse and fine skew measurement is included in copending coassigned U.S. patent application Ser. No. 07/737,863 entitled "Coarse and Fine Skew Measurement," incorporated herein by reference.

The code in Appendix A, when executed, generally follows the implementation described above, with Appendix A generally following the implementation described in relation to FIGS. 14A and 14B. Nonetheless, the code may differ from the above description in various ways. For example, the code may be divided into procedures or routines differently than described above.

Appendix A includes the following:

The function initialize sets up an array of directions by dividing 360° by the number of directions in which distance is to be measured.

The function scan-along-line measures distance from a starting pixel along a line at a given direction until a pixel is reached that has a specified color; the measured distance is returned.

The function build-histogram produces a profile of distance as a function of direction from a starting pixel, by calling scan-along-line for each direction in the array set up by initialize.

The function create-random-histogram produces an average profile of distance as a function of direction for an image by calling build-histogram for a number of random locations.

G. Miscellaneous

The invention has been described in relation to specific applications such as skew detection and dominant typeface identification. The invention might also be applicable to character or word identification.

The invention has been described in relation to implementations in which operations are performed on data defining an image to obtain data indicating distance as a function of direction. The invention might also be implemented with specialized circuitry connected to photosensors for directly measuring distance as a function of direction in an image.

The invention has been described in relation to software implementations, but the invention might be implemented with specialized hardware.

The invention has also been described in relation to implementations in which distances are measured from randomly selected locations. The starting locations for distance measurement could alternatively be selected with some other criterion, such as all pixels interior to connected components, all pixels at edges, or every Nth interior or edge pixel. Furthermore, it might not be necessary to measure distance in each direction from a given location; instead, distance might be measured from a different set of starting locations for each direction.

The invention has been described in relation to implementations in which distance is measured across a 360° range of equally separated directions. It might be possible to use a 180° range of directions. It might also be possible to identify a set of directions that are not equally separated but that provide the necessary information to indicate a characteristic being measured.

The invention has been described in relation to implementations in which distribution data for each direction is obtained by averaging measured distances. Other techniques might be used to obtain distribution data. For example, other measures of central value could be obtained, such as a mode or a median. A measure of variance could be obtained, such as a standard deviation. A mixed measure of central value and variance could be obtained, such as distances at which the frequency is a number of decibels below the mode. In general, distribution data can be obtained after all distance measurements are obtained or, to reduce data storage requirements, distance measurements can be combined as they are obtained, such as by summing.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

APPENDIX A

© Copyright 1990 Xerox Corporation    All Rights Reserved (zl:defvar white-pix 0) ;;; Be careful about these settings.

(zl:defvar black-pix 1)

(zl:defvar boundary 70) ; This is the maximum distance the scan-along-line function may go.

(zl:defvar scan-values 24) ; The number of directions scanned.

(zl:defvar direction-array nil) ;Eventually this will be the array holding the angles.
;;;
;;; The function in here "build-histogram" is parameterized by the stop and start pixels.
;;;; The skew routine uses a black start and a black stop pixel.

```
(defun initialize (scan-values begin end)
;Get everything rolling....
;;;Returns an array with the circle divided up into
;;; scan-value slices begining with the very beginning
;;; and continuing until the last end. Used in the code
;;; to set the angles.

(let ((direction-array (make-array scan-values)))

(if (< end begin) (setq end (+ 360 end)))

(do ((i 0 (1+ i)) (increm (/ (- end begin) scan-values)))
      ((= i scan-values))
    (setf (aref direction-array i) (mod (+ begin (* i increm)) 360)))
   direction-array))
(defun scan-along-line (arr x y angle stop-pix)
;Scans along a line defined by the angle until it finds a white
;pixel. Then it keeps going until it finds a pixel equal to stop
;;pixel.
 (multiple-value-bind (width height ignore) (decode-raster-array arr)
;;; Set up the increments. Take care of infinities and divide by zeros.
   (setq width (1- width))
   (setq height (1- height))
   (let* ((x-increm (sind angle)) (y-increm (cosd angle))
          (x-bar (+ x x-increm)) (y-bar (+ y y-increm)) (dist 0)

(dist-increm 1))         ; These are for counting out the steps.

;;;    (pprint (list "--- x:" x-increm " y:" y-increm))

(cond ((not (or (>= x-bar width) (>= y-bar height) (< x-bar 0) (< y-bar 0)
          (= (raster-aref arr (round x-bar) (round y-bar)) stop-pix)))
```

```
     (do ((stopp nil))
        ;; Start becomes true at the first white-pix. Then count
        ;; until the first black one upon which stopp becomes true.
        ((or stopp (> dist boundary) (>= x-bar width) (>= y-bar height)
           (< x-bar 0) (< y-bar 0)))

;;;      (print (list stopp x-bar y-bar (raster-aref arr (round x-bar) (round y-bar))))

(if (= (raster-aref arr (round x-bar) (round y-bar)) stop-pix)
          (setq stopp t))

(setq x-bar (+ x-bar x-increm))
        (setq y-bar (+ y-bar y-increm))
        (setq dist (+ dist dist-increm)))

;return the final distance.
      dist)
      (t 0)))))
(defun build-histogram (arr x y direction-array stop-color)
;arr is the array. (x,y) is the point for which
; the calling function would like to know the
; histogram of the distance (scan-along-line)
; function.

; Note that the angles to be scanned are computed
;; initially in the initialization function.

(let ((answer (make-array scan-values)))

(do ((i 0 (1+ i)))
     ((= i scan-values))
    (setf (aref answer i)
       (scan-along-line arr x y (aref direction-array i) stop-color)))

answer))
```

```
(defun create-random-histogram (arr num direction-array ran-seed pick-color stop-color)
;; Takes an array, chooses a num of points at random and
;; computes the histo-gram which results. This histogram contains
;; the average distance versus theta function. I ;; pick-color is the color of the points chosen at random.
;; stop-color is the color the scanning goes through until it stops.

(multiple-value-bind (width height ignore) (decode-raster-array arr)

(let* ((ran-loco ran-seed)
           (scan-values (si:decode-array direction-array))
           (answer (make-array scan-values :initial-element 0)) (count 0)
           (normalize (make-array scan-values :initial-element 0))
           (wid (- width 2)) (hei (- height 2)))

(do ((local-answer nil)
           (x (1+ (random wid ran-loco)) (1+ (random wid ran-loco)))
           (y (1+ (random hei ran-loco)) (1+ (random hei ran-loco))))

((= count num))      ;; Count is only incremememted when (x,y) = black-pix
;;;          (pprint (list x y (raster-aref arr x y)))
          (cond ((and (= pick-color (raster-aref arr x y))
                      (or  (/= pick-color (raster-aref arr (1+ x) y))  ;;; Just precludes
                           (/= pick-color (raster-aref arr (1- x) y))    ;;; edge pixels.
                           (/= pick-color (raster-aref arr x (1+ y)))
                           (/= pick-color (raster-aref arr (1+ x) (1+ y)))
                           (/= pick-color (raster-aref arr (1- x) (1+ y)))
                           (/= pick-color (raster-aref arr x (1- y)))
                           (/= pick-color (raster-aref arr (1+ x) (1- y)))
                           (/= pick-color (raster-aref arr (1- x) (1- y)))))
                 (setq local-answer (build-histogram arr x y direction-array stop-color))
;;                 (print-hist local-answer)
                 (do ((j 0 (1+ j)))
                     ((= j scan-values))
                   (setf (aref answer j) (+ (aref answer j) (aref local-answer j)))
                   (if (< 0 (aref local-answer j))
                       (setf (aref normalize j) (1+ (aref normalize j)))))
                 (setq count (1+ count))))))
      (do ((j 0 (1+ j)))
          ((= j scan-values))
;;;        (print (list "answer" (aref answer j) "count" (aref normalize j)))
        (if (< 0 (aref normalize j))
            (setf (aref answer j) (/ (aref answer j) (aref normalize j)))
            (setf (aref answer j) 0)))
      answer)))
```

What is claimed is:

1. A method of performing image processing on an image that includes a plurality of locations;

the method comprising a plurality of choosing acts, each choosing act choosing a starting location; the plurality of choosing acts together choosing a set of starting locations that includes more than one of the locations in the plurality of locations;

the method comprising, for each of the starting locations in the set, a plurality of distance obtaining acts, each distance obtaining act for a respective one of a plurality of directions; each direction's respective distance obtaining act obtaining respective distance data with respect to the starting location in the set; the direction's distance data indicating a distance in the direction from the starting location in the set to a respective other location at which the image meets a criterion;

the method further comprising an act of combining the respective distance data for each direction for all of the starting locations in the set to obtain combined distance data for each direction;

the plurality of choosing acts together choosing the set of starting locations so that the combined distance data for each direction indicate, for the image, distance in the direction to a location at which the image meets the criterion.

2. The method of claim 1 in which each of the plurality of locations is a pixel.

3. The method of claim 1 in which each distance obtaining act for each starting location in the set comprises:

starting at the starting location in the image; and for each of a sequence of locations along a line extending from the starting location in the direction through the image, obtaining respective length data indicating length from the starting location to the location along the line; the sequence including the respective other location at which the image meets the criterion; the respective length data of the respective other location being the direction's distance data.

4. The method of claim 3 in which each of the plurality of locations is a pixel and the criterion is an edge.

5. The method of claim 4 in which the respective other location at which the image meets the criterion is a black pixel separated from the starting location by white pixels; the distance data indicating length across the white pixels between the starting location and the respective other location at which the image meets the criterion.

6. The method of claim 4 in which the respective other location at which the image meets the criterion is a white pixel separated from the starting location by black pixels; the distance data indicating length across the black pixels between the starting location and the respective other location at which the image meets the criterion.

7. The method of claim 1 in which the plurality of directions includes adjacent first and second directions separated by a separating angle, the separating angle being small enough that the first direction's distance data and the second direction's distance data for each of the starting locations indicate whether the image contains a blob subtending the first and second directions within a limiting distance from the starting location.

8. The method of claim 7 in which the image has an outer dimensions and the limiting distance is equal to the outer dimension.

9. The method of claim 7 in which each of the plurality of directions is separated from each adjacent direction by an angle approximately equal to the separating angle.

10. The method of claim 7 in which the image includes blobs that form text that includes characters, adjacent ones of the characters being separated by intercharacter distances; the limiting distance being approximately equal to an average of the intercharacter distances so that the first direction's distance data and the second direction's distance data for each of the starting locations indicate whether the image contains a character subtending the first and second directions within the limiting distance from the starting location.

11. The method of claim 1 in which the act of combining comprises obtaining an average of the distances indicated by the respective distance data for each direction for all of the starting locations in the set.

12. The method of claim 1 in which the plurality of choosing acts together choose the set of starting locations so that the set includes a smaller number of locations than the image.

13. The method of claim 1, further comprising an act of storing each direction's combined distance data in memory so that the direction's combined distance data is accessible using direction data indicating the direction.

14. The method of claim 1 in which the image includes lines of characters at a skew; the method further comprising an act of using the combined distance data of all the directions to obtain skew data indicating the skew.

15. The method of claim 1 in which the image includes characters having a dominant typeface; the method further comprising an act of using the combined distance data of all the directions to obtain typeface data indicating the dominant typeface.

16. The method of claim 1 in which the combined distance data for all the directions form a profile of distance as a function of direction; the method further comprising an act of comparing the profile formed by the combined distance data with a set of model profiles of distance as a function of direction.

17. The method of claim 1 in which the combined distance data for all the directions form a profile of distance as a function of direction; the method further comprising an act of providing the profile formed by the combined distance data to a storage medium.

18. The method of claim 1 in which the combined distance data for all the directions form a profile of distance as a function of direction; the method further comprising an act of providing the profile formed by the combined distance data to a transmission medium.

19. An image processing machine comprising:

memory; the memory storing image data defining an image that includes a plurality of locations; and a processor connected for accessing the memory;

the memory further storing instruction data indicating instructions the processor can execute;

the processor, in executing the instructions, choosing a set of starting locations that includes more than one of the plurality of locations in the image;

the processor, in executing the instructions, using the image data to obtain, for each of a plurality of directions, respective distance data with respect to each of the starting locations in the set; each direction's distance data for each starting location indicating a distance in the direction from the starting location to a respective other location at which the image meets a criterion;.

the processor, in executing the instructions, combining the respective distance data for each direction for all of the starting locations in the set to obtain combined distance data for each direction;

the processor choosing the set of starting locations so that the combined distance data for each direction indicate, for the image, distance in the direction to a location at which the image meets the criterion.

20. The machine of claim 19, in which the image data include, for each location in the image, a respective data item indicating a respective value;

the processor, in obtaining each direction's respective distance data for each starting location, obtaining length data indicating a length along a line from the starting location in the direction;

the processor, in obtaining each direction's respective distance data for each starting location, using the length data to access the respective data item of a second location at the indicated length in the direction from the starting location to determine whether the second location's value meets the criterion.

21. The machine of claim 20 in which the processor, in obtaining each direction's respective distance data for each starting location, stores the length data when the second location's value meets the criterion; the stored length data being the distance data for the direction.

22. The machine of claim 21 in which the processor stores the length data so that it can be accessed using direction data indicating the direction.

23. The machine of claim 19 in which the processor combines the respective distance data by obtaining an average of the distances indicated by the respective distance data for each direction for all of the starting locations.

24. The machine of claim 19 in which the processor comprises a plurality of processing units, the memory comprising respective local memory for each processing unit; the image data including, for each location in the image, a respective data item indicating a respective value, each processing unit's respective local memory being for storing the respective data item of a respective location in the image; the processing units executing the instructions in parallel.

25. The machine of claim 19 in which the image includes lines of characters at a skew; the processor, in executing the instructions, using the combined distance data to obtain skew data indicating the skew.

26. The machine of claim 19 in which the image includes characters having a dominant typeface; the processor, in executing the instructions, using the combined distance data to obtain typeface data indicating the dominant typeface.

27. The machine of claim 19 in which the combined distance data for all the directions form a profile of distance as a function of direction; the memory storing a set of model profiles of distance as a function of direction, the processor, in executing the instructions, comparing the profile formed by the combined distance data with the model profiles.

28. The machine of claim 27, further comprising input means for receiving data from sources outside the machine, the processor being connected for receiving data from the input means, the processor, in executing the instructions, receiving the set of model profiles and storing the set of model profiles in memory.

29. The machine of claim 28 in which the input means is for receiving data from a storage medium.

30. The machine of claim 28 in which the input means is for receiving data from a transmission medium.

31. The machine of claim 19 in which the combined distance data for all the directions form a profile of distance as a function of direction; the machine further comprising output means for providing data to destinations outside the machine; the processor being connected for providing data to the output means, the processor, in executing the instructions, providing the profile formed by the combined distance data to the output means.

32. The machine of claim 31 in which the output means is for providing data to a storage medium.

33. The machine of claim 31 in which the output means is for providing data to a transmission medium.

* * * * *